United States Patent
Gao et al.

(10) Patent No.: US 11,101,860 B2
(45) Date of Patent: Aug. 24, 2021

(54) METHOD, APPARATUS, AND ELECTRONIC DEVICE OF DETERMINING BEAM RECIPROCITY OF A DEVICE

(71) Applicant: CHINA ACADEMY OF TELECOMMUNICATIONS TECHNOLOGY, Beijing (CN)

(72) Inventors: Qiubin Gao, Beijing (CN); Rakesh Tamrakar, Beijing (CN); Xin Su, Beijing (CN); Qiuping Huang, Beijing (CN); Hui Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 29 days.

(21) Appl. No.: 16/494,989

(22) PCT Filed: Mar. 8, 2018

(86) PCT No.: PCT/CN2018/078469
§ 371 (c)(1),
(2) Date: Sep. 17, 2019

(87) PCT Pub. No.: WO2018/166401
PCT Pub. Date: Sep. 20, 2018

(65) Prior Publication Data
US 2020/0287604 A1 Sep. 10, 2020

(30) Foreign Application Priority Data

Mar. 17, 2017 (CN) .......................... 201710160629.6

(51) Int. Cl.
*H04B 7/06* (2006.01)
*H04B 7/08* (2006.01)
*H04B 7/0413* (2017.01)

(52) U.S. Cl.
CPC ......... *H04B 7/0617* (2013.01); *H04B 7/0695* (2013.01); *H04B 7/088* (2013.01); *H04B 7/0413* (2013.01)

(58) Field of Classification Search
CPC .......... H04B 7/04; H04B 7/0413; H04B 7/06; H04B 7/0617; H04B 7/0695; H04B 7/08; H04B 7/088
See application file for complete search history.

(56) References Cited

U.S. PATENT DOCUMENTS

| 10,637,544 B1* | 4/2020 | Shattil | ................. H04B 7/0413 |
| 2009/0028260 A1* | 1/2009 | Xiao | ..................... H04L 5/0044 |
| | | | 375/260 |

(Continued)

FOREIGN PATENT DOCUMENTS

| CN | 102326338 A | 1/2012 |
| CN | 104735685 A | 6/2015 |

(Continued)

OTHER PUBLICATIONS

European Patent Office, Munich, Germany, Communication, European Search Report, dated Jan. 20, 2008, PCT/CN2018078469, China Academy of Telecommunications Technology.

(Continued)

*Primary Examiner* — David B Lugo
(74) *Attorney, Agent, or Firm* — Harness, Dickey & Pierce, P.L.C.

(57) ABSTRACT

A method, an apparatus, and an electronic device of determining beam reciprocity of a device, and a computer readable storage medium are provided. The method includes: instructing a second device to transmit, by using a transmission beam obtained based on beam reciprocity, a reference signal; receiving the reference signal transmitted by the second device, and calculating a reception quality of the reference signal; receiving a plurality of beam training (Continued)

signals transmitted by the second device, and calculating reception qualities of the plurality of beam training signals, respectively; comparing the reception quality of the reference signal with a reference reception quality obtained based on the reception qualities of the plurality of beam training signals, and determining, based on a result of the comparison, whether the beam reciprocity of the second device is established or not.

17 Claims, 7 Drawing Sheets

(56) References Cited

U.S. PATENT DOCUMENTS

| | | | |
|---|---|---|---|
| 2010/0214169 | A1 | 8/2010 | Kafle |
| 2016/0285583 | A1* | 9/2016 | Kasher ................. H04B 7/0695 |
| 2018/0191483 | A1 | 7/2018 | Yamazaki et al. |
| 2018/0367425 | A1* | 12/2018 | Zhang .................... H04L 29/08 |
| 2020/0037297 | A1* | 1/2020 | Pan ....................... H04W 16/28 |

FOREIGN PATENT DOCUMENTS

| | | |
|---|---|---|
| CN | 105790886 A | 7/2016 |
| CN | 106027181 A | 10/2016 |
| WO | 2010099040 A1 | 9/2010 |
| WO | 2015089894 A1 | 6/2015 |
| WO | 2016055102 A1 | 4/2016 |
| WO | 2016160728 A1 | 10/2016 |
| WO | 2017038337 A1 | 3/2017 |

OTHER PUBLICATIONS

3GPP TSG RAN WG1 NR Ad-Hoc Meeting, R1-1700163, Spokane, Washington, USA, Jan. 16-20, 2017, Agenda Item: 5.1.2.2, Source: Mediatek Inc., Title: Considerations on Beam Correspondence, Document for: Discussion.

3GPP TSG RAN WG1 AH_NR Meeting, R1-1700274, Spokane, USA, Jan. 16-20, 2017, Source: Vivo, Title: Discussion on Beam Management for NR MIMO, Agenda Item: 5.1.2.2, Document for: Discussion and Decision.

3GPP TSG-RAN WG1-NR, R1-1700599, Agenda Item: 5.1.2.2, Source: NTT Docomo, Inc., Title: Definition of Beam Correspondence and Beam Correspondence Determination Mechanism, Document for: Discussion and Decision.

International Search Report, Patent Cooperation Treaty, PCT/CN2018/078469, Advance Email, dated Sep. 26, 2019, Applicant: China Academy of Telecommunications Technology.

The State Intellectual Property Office of Peoples Republic of China, China Academy of Telecommunications Technology, Title of Invention: Method and Device for Determining Equipment Beam Reciprocity and Electronic Equipment, First Office Action, Publication Date: Oct. 6, 2016.

The Japan Patent Office, First Office Action, Application No. 2019-551303, dated Nov. 30, 2020, Applicant: China Academy of Telecommunications Technology.

3GPP TSG RAN WG1 Meeting 88, R1-1702941, Feb. 13-17, 2017, Athens, GR, Agenda Item: 8.1.2.2.3, Source: Samsung: Title: Discussion on Beam Correspondence, Document for: Discussion and Decision.

3GPP TSG RAN WG1 AH_NR Meeting, R1-1700274, Spokane, USA, Jan. 16-20, 2017, Agenda Item 5.1.2.2, Source: vivo, Title: Discussion on beam management for NR MIMO, Document for: Discussion and Decision.

India Patent Office, Examination Report, IN App. No. 201927040851, Applicant: China Academy of Telecommunications Technology, Date of Dispatch: Mar. 27, 2021.

Korean Patent Office, Notification of Reason for Refusal, KR App. No. 10-2019-7030213, Applicant: China Academy of Telecommunications Technology, Date of Dispatch: Feb. 22, 2021.

3GPP TSG RAN WG1 Meeting 88, R1-1702909, Athens, Greece, Feb. 13-17, 2017, Agenda Item: 8.1.1.4.2, Source: Samsung, Title: 4-Step Random Access Procedure, Document for: Discussion and Decision.

* cited by examiner

METHOD, APPARATUS, AND ELECTRONIC DEVICE OF DETERMINING BEAM RECIPROCITY OF A DEVICE

CROSS-REFERENCE TO RELATED APPLICATION

The present application is a U.S. national phase application of a PCT Application No. PCT/CN2018/078469 filed on Mar. 8, 2018, which claims a priority to a Chinese patent application No. 201710160629.6 filed in China on Mar. 17, 2017, the disclosure of which is incorporated herein by reference in its entirety.

TECHNICAL FIELD

The present disclosure relates to the field of communication technology, and more particularly, relates to a method, an apparatus, and an electronic device of determining beam reciprocity of a device.

BACKGROUND

In view of an important role of a MIMO (Multiple-Input Multiple-Output) technology in improving a peak rate and a system spectrum utilization, radio access technology standards such as a Long Term Evolution (LTE)/LTE-A (LTE-Advanced) are all devised based on the MIMO technology and an OFDM (Orthogonal Frequency Division Multiplexing) technology, i.e., MIMO+OFDM. A performance gain of the MIMO technology originates from a spatial freedom degree obtainable by a multi-antenna system. Thus, one of the most important evolution directions of the MIMO technology in a standardization process is an expansion of dimensions.

In a LTE Rel-8 (Release 8), a MIMO transmission of up to 4 layers may be supported. In Rel-9 (Release 9), a MU-MIMO technology is enhanced; a transmission based on MU-MIMO (Multi-User MIMO) in a TM (Transmission Mode)-8 may support up to 4 downlink data layers. A Rel-10 (Release 10) introduces a support for 8 antenna ports to further improve a spatial resolution of channel state information, and further extends a transmission capability of a SU-MIMO (Single-User MIMO) to 8 data layers at most. A Rel-13 and a Rel-14 introduce FD-MIMO (Full Dimension MIMO) technology which supports up to 32 ports so as to achieve a full-dimensional and vertical beamforming.

In order to further develop the MIMO technology, a large-scale antenna (massive MIMO) technology is introduced into a mobile communication system. For a base station, a fully digitized large scale antenna may have up to 128/256/512 antenna oscillators, and up to 128/256/512 transceivers, wherein each of the antenna oscillators is connected to one of the transceivers. By transmitting pilot signals for the up to 128/256/512 antenna ports, a terminal may measure channel state information and feed the measured channel state information back. An antenna array of up to 32/64 antenna oscillators may also be arranged of the terminal. Through beamforming at both of the base station and the terminal, a significant beamforming gain is obtained to compensate for a signal attenuation caused by a path loss. In particular, during high-frequency-band communication, such as a communication at 30 GHz frequency points, the path loss renders a coverage range of a wireless signal to be extremely limited. By means of the large-scale antenna technology, the coverage range of the wireless signal may be extended to an applicable range.

In an all-digital antenna array, each antenna oscillator is provided with a separate transceiver, which will greatly increase a size, a cost and a power consumption of a device including the antenna array. Especially, as for a Analog-to-Digital Converter (ADC) and a Digital-to-Analog Converter (DAC) of a transceiver, power consumptions thereof are reduced by only about $\frac{1}{10}$ in a past decade, and performance improvements thereof are relatively limited. In order to reduce the size, the cost and the power consumption of the device, a technical scheme of a transceiver architecture based on an analog beamforming technology and a digital-analog hybrid beamforming technology is proposed.

Both the analog beamforming and the digital-to-analog hybrid beamforming require adjusting analog beamforming weights at a transmission end and a reception end, so that a formed beam may be directed to an opposite communication end. For a downlink transmission, a beamforming weight transmitted at a base station side and a beamforming weight received at a terminal side need to be adjusted. For an uplink transmission, the beamforming weight transmitted at the terminal side and the beamforming weight received at the base station side need to be adjusted. A beamforming weight is usually obtained by transmitting a training signal. In a downlink direction, the base station transmits a downlink beam training signal; and the terminal measures the downlink beam training signal, selects an optimal transmission beam transmitted by the base station, feeds beam-related information back to the base station, and selects a corresponding optimal reception beam and stores information of the corresponding optimal reception beam locally. In an uplink direction, the terminal transmits a uplink beam training signal; and, the base station measures the uplink beam training signal, selects an optimal transmission beam transmitted by the terminal, transmits beam-related information to the terminal, selects a corresponding optimal reception beam, and stores information of the corresponding optimal reception beam locally. After transmission and reception beams in uplink and downlink are trained successfully, data transmission may be performed.

Due to non-ideal characteristics of a device in application and non-reciprocity of uplink interference and downlink interference, beam reciprocity in uplink and downlink is not always satisfied. Therefore, the base station or the terminal needs a method capable of testing whether the beam reciprocity of the opposite communication end is satisfied, so as to improve a communication quality.

SUMMARY

In light of the above, some embodiments of that present disclosure provide a method and an apparatus of determining beam reciprocity of a device, a computer readable storage medium, and an electronic device, so as to improve a communication quality.

In order to address above technical problems, some embodiments of the present disclosure provide a method of determining beam reciprocity of a device. The method is applied to a first device and includes: instructing a second device to transmit, by using a transmission beam obtained based on beam reciprocity, a reference signal; receiving the reference signal transmitted by the second device, and calculating a reception quality of the reference signal; receiving a plurality of beam training signals transmitted by the second device, and calculating reception qualities of the plurality of beam training signals, respectively; comparing the reception quality of the reference signal with a reference reception quality obtained based on the reception qualities of the plurality of beam training signals, and determining, based on a result of the comparison, whether the beam reciprocity of the second device is established or not.

Wherein, the instructing the second device to transmit a reference signal using a transmission beam based on beam reciprocity, includes: transmitting a first signaling to the second device, wherein the first signaling is used to instruct the second device to determine, based on a current optimal reception beam of the second device or based on a reception beam used currently, a transmission beam, and is used to instruct the second device to transmit, by using the determined transmission beam, the reference signal; or transmitting a second signaling to the second device, wherein the second signaling includes identification information of a target transmission beam, the second signaling is used to indicate the second device to determine, based on the identification information by using an optimal reception beam corresponding to the target transmission beam, a transmission beam, and is used to instruct the second device to transmit, by using the determined transmission beam, the reference signal.

Wherein, receiving the reference signal transmitted by the second device, includes: receiving the reference signal by using a reception beam corresponding to a current transmission beam or a reception beam corresponding to a target transmission beam indicated to the second device, if the first device has the beam reciprocity; or at a present time point, receiving the reference signal by using a plurality of candidate reception beams, and determining a candidate reception beam having an optimal signal quality, and receiving, by using the candidate reception beam having the optimal signal quality, the reference signal subsequently transmitted; or receiving the reference signal by using an optimal beam-training-signal reception beam, wherein the optimal beam-training-signal reception beam is a reception beam having an optimal signal quality for receiving the plurality of beam training signals.

Wherein, receiving the plurality of beam training signals transmitted by the second device, includes: receiving the plurality of beam training signals by using a reception beam corresponding to a current transmission beam or a reception beam corresponding to a target transmission beam indicated to the second device, if the first device has the beam reciprocity; or receiving the plurality of beam training signals by using a reception beam having an optimal signal quality for receiving the reference signal; or receiving the plurality of beam training signals by using candidate reception beams at a present time point, respectively, and determining a candidate reception beam having an optimal signal quality, and receiving, by using the candidate reception beam having the optimal signal quality, beam training signals transmitted subsequently.

Wherein, comparing the reception quality of the reference signal with the reference reception quality obtained based on the reception qualities of the plurality of beam training signals, and determining, based on the result of the comparison, whether the beam reciprocity of the second device is established or not, includes: determining a maximum reception quality among the reception qualities of the plurality of beam training signals, and taking the maximum reception quality as the reference reception quality; determining that the beam reciprocity of the second device is established if the reception quality of the reference signal is greater than the reference reception quality, or if difference between the reference reception quality and the reception quality of the reference signal is less than a predefined threshold; otherwise, determining that the beam reciprocity of the second device is not established.

Wherein, comparing the reception quality of the reference signal with the reference reception quality obtained based on the reception qualities of the plurality of beam training signals, and determining, based on the result of the comparison, whether the beam reciprocity of the second device is established or not, includes: sorting the reception qualities of the plurality of beam training signals in a descending order, and selecting reception qualities of top K beam training signals in a sorting result, wherein K is an integer greater than 1; calculating an average value of the reception qualities of the K beam training signals, and taking the average value as the reference reception quality; determining that the beam reciprocity of the second device is established if the reception quality of the reference signal is greater than the reference reception quality, or if the difference between the reference reception quality and the reception quality of the reference signal is less than a predefined threshold; otherwise, determining that the beam reciprocity of the second device is not established.

Wherein, before receiving the plurality of beam training signals transmitted by the second device, the method further includes: instructing the second device to transmit the plurality of beam training signals; and, receiving the plurality of beam training signals transmitted by the second device specifically includes receiving the plurality of beam training signals transmitted according to the indication by the second device.

Wherein, the method further includes: transmitting first indication information to the second device, if the beam reciprocity of the second device is determined to be established, wherein the first indication information is used to instruct the second device to transmit, by using a reciprocal beam, data; or transmitting second indication information to the second device, if the beam reciprocity of the second device is determined to not be established, wherein the second indication information is used to instruct the second device to transmit, by using a first designated transmission beam, data; or transmitting third indication information to the second device, if the second device is determined to transmit, by using a beam indicated by the first device, data and the beam reciprocity of the second device is determined to be established, wherein the third indication information is used to indicate the second device to transmit, by using a reciprocal beam, data; or transmitting fourth indication information to the second device, if the second device is determined to transmit, by using a beam indicated by the first device, data and the beam reciprocity of the second device is determined to not be established, wherein the fourth indication information is used to indicate the second device to transmit, by using a second designated transmission beam, data.

Wherein, the second indication information includes an identifier of the first designated transmission beam, the fourth indication information includes an identifier of the second designated transmission beam.

Wherein, comparing the reception quality of the reference signal with the reference reception quality obtained based on the reception qualities of the plurality of beam training signals, and determining, based on the result of the comparison, whether the beam reciprocity of the second device is established or not, includes: comparing, by the first device, the reception quality of the reference signal with the reference reception quality obtained based on the reception qualities of the plurality of beam training signals, and determining, based on the result of the comparison, whether the beam reciprocity of the second device is established or not; or, transmitting, by the first device to the second device, the reception quality of the reference signal and the reference reception quality obtained based on the reception qualities of the plurality of beam training signals, so that the second device compares the reception quality of the reference signal with the reference reception quality obtained based on the reception qualities of the plurality of beam training signals, and determines, based on the result of the comparison, whether the beam reciprocity of the second device is established or not; or comparing, by the first device, the reception quality of the reference signal with the reference reception quality obtained based on the reception qualities of the plurality of beam training signals, and transmitting the result of the comparison to the second device, so that the second device determines, based on the result of the comparison, whether the beam reciprocity of the second device is established or not.

In a second aspect, some embodiments of the present disclosure provide a method of determining beam reciprocity of a device. The method is applied to a second device and includes: receiving an indication from the first device; transmitting, according to the indication from the first device, a reference signal by using a transmission beam obtained based on beam reciprocity, so that the first device calculates a reception quality of the reference signal; transmitting a plurality of beam training signals to the first device, so that reception qualities of the plurality of beam training signals are calculated, respectively, the reception quality of the reference signal is compared with a reference reception quality obtained based on the reception qualities of the plurality of beam training signals, and whether beam reciprocity of the second device is established or not is determined based on a result of the comparison.

Wherein, transmitting, according to the indication from the first device, the reference signal by using the transmission beam obtained based on beam reciprocity, includes: receiving a first signaling from the first device, and determining, according to the first signaling, a transmission beam by using a current optimal reception beam or a reception beam used currently, and transmitting the reference signal by using the determined transmission beam; or receiving a second signaling from the first device, the second signaling including identification information of a target transmission beam; determining, based on the identification information, a transmission beam by using an optimal reception beam for receiving the target transmission beam; and transmitting the reference signal by using the determined transmission beam.

Wherein, before transmitting the plurality of beam training signals to the first device, the method further includes: receiving from the first device an indication for transmitting the plurality of beam training signals. Transmitting the plurality of beam training signals to the first device specifically includes: transmitting the plurality of beam training signals to the first device according to the indication for transmitting the plurality of beam training signals.

Wherein, the method further includes: receiving first indication information from the first device and transmitting, according to the first indication information, data by using a reciprocal beam, wherein the first indication information is transmitted by the first device when the first device determines that the beam reciprocity of the second device is established; or receiving second indication information from the first device, and transmitting, according to the second indication information, data by using a first designated transmission beam, wherein the second indication information is transmitted by the first device when the first device determines that beam reciprocity of the second device is not established; or receiving third indication information from the first device, and transmitting, according to the third indication information, data by using a reciprocal beam, wherein the third indication information is transmitted by the first device when the first device determines that beam reciprocity of the second device is established and the second device transmits data by using a beam indicated by the first device; or receiving fourth indication information from the first device and transmitting, according to the fourth indication information, data by using a second designated transmission beam, wherein the fourth indication information is transmitted by the first device when the first device determines that the beam reciprocity of the second device is not established and the second device transmits data by using a beam indicated by the first device.

Wherein the second indication information includes an identifier of the first designated transmission beam; the fourth indication information further includes an identifier of the second designated transmission beam; transmitting, according to the fourth indication information, data by using the second designated transmission beam, specifically includes: transmitting, according to the fourth indication information, data by using the second designated transmission beam corresponding to the identifier of the second designated transmission beam.

Wherein, transmitting the plurality of beam training signals to the first device, so that reception qualities of the plurality of beam training signals are calculated, respectively, the reception quality of the reference signal is compared with a reference reception quality obtained based on the reception qualities of the plurality of beam training signals, and whether beam reciprocity of the second device is established or not is determined based on the result of the comparison, includes: transmitting, by the second device, the plurality of beam training signals to the first device such that the first device calculates reception qualities of the plurality of beam training signals, respectively, compares the reception quality of the reference signal with the reference reception quality obtained based on the reception qualities of the plurality of beam training signals, and determines, based on the result of the comparison, whether the beam reciprocity of the second device is established or not; or, transmitting, by the second device, the plurality of beam training signals to the first device such that the first device calculates the reception qualities of the plurality of beam training signals, respectively, transmits to the second device the reception quality of the reference signal and the reference reception quality obtained based on the reception qualities of the plurality of beam training signals, and the second device compares the reception quality of the reference signal with the reference reception quality obtained based on the reception qualities of the plurality of beam training signals and determines, based on the result of the comparison, whether the beam reciprocity of the second device is established or not; or transmitting, by the second device, the plurality of beam training signals to the first device so that the first device calculates reception qualities of the plurality of beam training signals, respectively, compares the reception quality of the reference signal with the reference reception quality obtained based on the reception qualities of the plurality of beam training signals, and transmits a result of the comparison to the second device, the second device determines, based on the result of the comparison, whether the beam reciprocity of the second device is established or not.

In a third aspect, some embodiments of the present disclosure provide an apparatus of determining beam reciprocity of a device. The apparatus includes an indication module, configured to instruct a second device to transmit a reference signal by using a transmission beam obtained based on beam reciprocity; a first calculation module, configured to receive the reference signal transmitted by the second device, and calculate a reception quality of the reference signal; a second calculation module, configured to receive a plurality of beam training signals transmitted by the second device, and calculate reception qualities of the plurality of beam training signals, respectively; a processing module, configured to compare the reception quality of the reference signal with a reference reception quality obtained based on the reception qualities of the plurality of beam training signals, and determine, based on a result of the comparison, whether the beam reciprocity of the second device is established or not.

Wherein the indication module is specifically configured to: transmit a first signaling to the second device, wherein the first signaling is used to instruct the second device to determine, based on a current optimal reception beam of the second device or based on a reception beam used currently, a transmission beam, and instruct the second device to transmit the reference signal by using the determined transmission beam; or, transmit a second signaling to the second device, wherein the second signaling includes identification information of a target transmission beam, the second signaling is used to indicate the second device to determine, based on the identification information by using an optimal reception beam corresponding to the target transmission beam, a transmission beam and is used to instruct the second device to transmit, by using the determined transmission beam, the reference signal.

Wherein the first calculation module includes: a first reception submodule, configured to: if beam reciprocity exists, receive the reference signal by using a reception beam corresponding to a current transmission beam or a reception beam corresponding to the target transmission beam indicated to the second device; or, receive the reference signal by using candidate reception beams at a present time point, and determine a candidate reception beam having an optimal signal quality, and receive, by using the candidate reception beam having the optimal signal quality, the reference signal subsequently transmitted; or, receive the reference signal by using an optimal beam-training-signal reception beam, wherein the optimal beam-training-signal reception beam is a reception beam having an optimal signal quality for receiving the beam training signals; a first calculation submodule, configured to calculate the reception quality of the reference signal.

Wherein the second calculation module includes: a second reception submodule, configured to: if the beam reciprocity exists, receive the beam training signals by using a reception beam corresponding to a current transmission beam or a reception beam corresponding to the target transmission beam indicated to the second device; or, receive the beam training signals by using a reception beam having an optimal signal quality for receiving the reference signal; or, receive the beam training signals by using candidate reception beams at a present time point, respectively, and determine a candidate reception beam having an optimal signal quality, and receive, by using the candidate reception beam having the optimal signal quality, beam training signals transmitted subsequently; a second calculation submodule, configured to calculate reception qualities of the plurality of beam training signals, respectively.

Wherein the processing module includes: a first determination submodule, configured to: determine a maximum reception quality among the reception qualities of the plurality of beam training signals, and take the maximum reception quality as the reference reception quality; a second determination submodule, configured to, if the reception quality of the reference signal is greater than the reference reception quality, or if difference between the reference reception quality and the reception quality of the reference signal is less than a predefined threshold, determine that the beam reciprocity of the second device is established; otherwise, determine that the beam reciprocity of the second device is not established.

Wherein the processing module includes: a sort submodule, configured to sort the reception qualities of the plurality of beam training signals in a descending order, and select reception qualities of top K beam training signals in a sorting result, wherein K is an integer greater than 1; a calculation submodule, configured to calculate an average value of the reception qualities of the K beam training signals, and take the average value as the reference reception quality; a third determination submodule, configured to, if the reception quality of the reference signal is greater than the reference reception quality, or if the difference between the reference reception quality and the reception quality of the reference signal is less than the predefined threshold, determine that the beam reciprocity of the second device is established; otherwise, determine that beam reciprocity of the second device is not established.

Wherein the indication module is further configured to instruct the second device to transmit the plurality of beam training signals; the first calculation module is specifically configured to: when receiving the plurality of beam training signals transmitted by the device, receive the plurality of beam training signals transmitted by the second device according to the indication.

Wherein, the apparatus further includes a transmission module, the transmission module is configured to: if the beam reciprocity of the second device is determined to be established, transmit first indication information to the second device, wherein the first indication information is used to instruct the second device to transmit, by using a reciprocal beam, data; or the transmission module is configured to: if the beam reciprocity of the second device is determined to not be established, transmit second indication information to the second device, wherein the second indication information is used to indicate the second device to transmit, by using a first designated transmission beam, data; or the transmission module is configured to: if the second device is determined to transmit data by using an indicated beam and the beam reciprocity of the second device is determined to be established, transmit third indication information to the second device, wherein the third indication information is used to indicate the second device to transmit, by using a reciprocal beam, data; or the transmission module is configured to: if the second device is determined to transmit data by using an indicated beam and the beam reciprocity of the second device is determined to not be established, transmit fourth indication information to the second device, wherein the fourth indication information is used to indicate the second device to transmit, by using a second designated transmission beam, data.

Wherein the second indication information includes an identifier of the first designated transmission beam, the fourth indication information includes an identifier of the second designated transmission beam.

Wherein the processing module is specifically configured to: transmit to the second device the reception quality of the reference signal and the reference reception quality obtained based on the reception qualities of the plurality of beam training signals, so that the second device compares the reception quality of the reference signal with the reference reception quality obtained based on the reception qualities of the plurality of beam training signals, and determines, based on a result of the comparison, whether the beam reciprocity of the second device is established or not; or, compare the reception quality of the reference signal with the reference reception quality obtained based on the reception qualities of the plurality of beam training signals, and transmit a result of the comparison to the second device, so that the second device determines, based on the result of the comparison, whether the beam reciprocity of the second device is established or not.

In a fourth aspect, some embodiments of the present disclosure provide an apparatus of determining beam reciprocity of a device. The apparatus includes a reception module, configured to receive an indication from the first device; a first transmission module, configured to transmit, according to the indication from the first device, a reference signal by using a transmission beam obtained based on beam reciprocity, so that the first device calculates a reception quality of the reference signal; a second transmission module, configured to transmit a plurality of beam training signals to the first device so that reception qualities of the plurality of beam training signals are calculated, respectively, the reception quality of the reference signal is compared with a reference reception quality obtained based on the reception qualities of the plurality of beam training signals, and whether beam reciprocity of the second device is established or not is determined based on a result of the comparison.

Wherein the first transmission module is specifically configured to: receive a first signaling from the first device, determine, according to the first signaling, a transmission beam by using a current optimal reception beam or a reception beam used currently, and transmit the reference signal by using the determined transmission beam; or receive a second signaling from the first device, wherein the second signaling includes identification information of a target transmission beam; determine, according to the identification information, a transmission beam by using an optimal reception beam for receiving the target transmission beam, and transmit the reference signal by using the determined transmission beam.

Wherein the reception module is further configured to receive from the first device an indication for transmitting a plurality of beam training signals; the second transmission module is specifically configured to: when transmitting the plurality of beam training signals to the first device, transmit the plurality of beam training signals to the first device according to the indication for transmitting the plurality of beam training signals.

Wherein the reception module is further configured to receive a test result about the beam reciprocity of the first device; the apparatus further includes a processing module, the processing module is configured to: receive first indication information from the first device and transmit, according to the first indication information, data by using a reciprocal beam, wherein the first indication information is transmitted by the first device when the first device determines that the beam reciprocity of the second device is established; or the processing module is configured to receive second indication information from the first device, and transmit, according to the second indication information, data by using a first designated transmission beam, wherein the second indication information is transmitted by the first device when the first device determines that beam reciprocity of the second device is not established; or the processing module is configured to receive third indication information from the first device, and transmit, according to the third indication information, data by using a reciprocal beam, wherein the third indication information is transmitted by the first device when the first device determines that beam reciprocity of the second device is established and the second device transmits data by using a beam indicated by the first device; or the processing module is configured to receive fourth indication information from the first device and transmit, according to the fourth indication information, data by using a second designated transmission beam, wherein the fourth indication information is transmitted by the first device when the first device determines that the beam reciprocity of the second device is not established and the second device transmits data by using a beam indicated by the first device.

Wherein the second indication information includes an identifier of the first designated transmission beam for instructing the second device to transmit, by using the first designated transmission beam, data; the fourth indication information further includes an identifier of the second designated transmission beam; the processing module is further configured to, when transmitting, according to the fourth indication information, data by using the second designated transmission beam, transmit, according to the fourth indication information, data by using the second designated transmission beam corresponding to the identifier of the second designated transmission beam.

Wherein the second transmission module is specifically configured to: transmit the plurality of beam training signals to the first device such that the first device calculates the reception qualities of the plurality of beam training signals, respectively and transmits to the second device the reception quality of the reference signal and the reference reception quality obtained based on the reception qualities of the plurality of beam training signals, and the second device compares the reception quality of the reference signal with the reference reception quality obtained based on the reception qualities of the plurality of beam training signals and determines, based on the result of the comparison, whether the beam reciprocity of the second device is established or not; or transmitting the plurality of beam training signals to the first device so that the first device calculates reception qualities of the plurality of beam training signals, respectively, compares the reception quality of the reference signal with the reference reception quality obtained based on the reception qualities of the plurality of beam training signals, and transmits a result of the comparison to the second device, the second device determines, based on the result of the comparison, whether the beam reciprocity of the second device is established or not.

In a fifth aspect, some embodiments of the present disclosure provide an electronic device. The electronic device includes: a housing, a processor, a storage, a circuit board, and a power supply circuit, wherein the circuit board is disposed inside space enclosed by the housing, and the processor and the storage are disposed on the circuit board, the power supply circuit is used for supplying power to the processor, the storage, the circuit board in the electronic device, the storage is used for storing executable program codes, the processor executes a program corresponding to the executable program codes by reading the executable program codes stored in the storage and executes the method of determining beam reciprocity of a device in the above first aspect and second aspect.

In a fifth aspect, a computer readable storage medium for storing a computer program, wherein when the computer program is executed by a processor, the processor performs a method of determining beam reciprocity of a device in the above first aspect and second aspect.

Beneficial effects of the above technical solutions of the present disclosure are as follows: in some embodiments of that present disclosure, the first device calculates a reception quality of a pilot signal, the pilot signal being transmitted by the second device by using a transmission beam obtained based on beam reciprocity, and calculates reception qualities of a plurality of beam training signals based on the received plurality of beam training signals from the second device; thereafter, the reception quality of the pilot signal is compared with a reference reception quality obtained based on the reception qualities of the plurality of beam training signals, and whether beam reciprocity of the second device is established or not is determined based on a result of the comparison. Therefore, by using the technical solutions of some embodiments of the present disclosure, the first device may reliably determine whether the beam reciprocity of the second device is established or not, so that a corresponding beam may be accurately selected for data transmission, thereby improving the communication quality.

DETAILED DESCRIPTION

Detailed description of embodiments of the present disclosure will be described in further detail below in conjunction with accompanying drawings. The following embodiments are used to illustrate the present disclosure, but are not intended to limit the scope of the disclosure.

Figure 1:
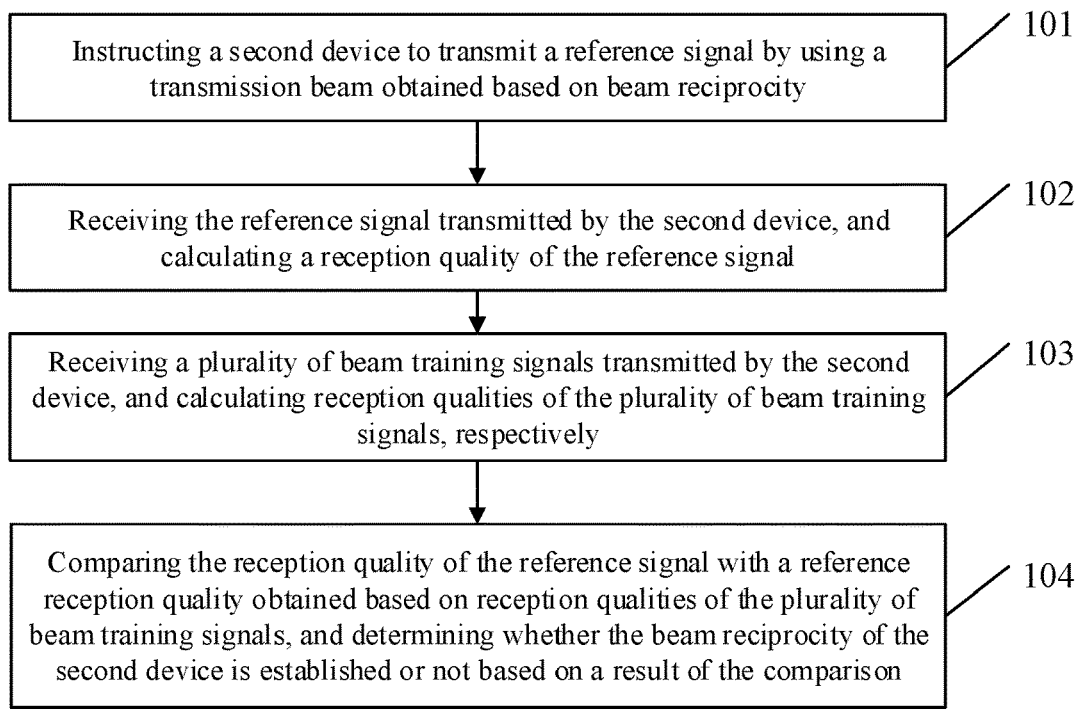
FIG. 1 is a first flow diagram of a method of determining beam reciprocity of a device according to some embodiments of the present disclosure.

As shown in FIG. 1, a method of determining beam reciprocity of a device according to some embodiments of the present disclosure is provided. The method is applied to a first device, the first device may be a base station or a terminal, and correspondingly, a second device in subsequent steps may be the terminal or the base station. In particular, the method includes following steps 101-104.

Step 101: instructing the second device to transmit a reference signal by using a transmission beam obtained based on the beam reciprocity.

A beam reciprocity of a transmission beam and a reception beam means that transmission and reception performed by a device may use a same set of beamforming weights to generate the transmission beam or the reception beam directed to a same direction; or the transmission beam and the reception beam have an established correspondence relation, that is, if a reception beam for a terminal or a base station is determined, a transmission beam for the terminal or the base station may be determined based on the correspondence relation; vice versa, i.e. if a transmission beam for the terminal or the base station is determined, a reception beam for the terminal or the base station may be determined based on the correspondence relation.

In a practical application, the second device may obtain a transmission beam based on beam reciprocity of the second device, regardless of whether or not the beam reciprocity of the second device is currently established. However, a signal quality of a transmission signal from the second device when the beam reciprocity of the second device is established is better than a signal quality of a transmission signal from the second device when the beam reciprocity is not established. Therefore, in some embodiments of the present disclosure, in order to improve a communication quality, whether the beam reciprocity of the second device is established or not needs to be determined.

Specifically, in practical applications, the first device may indicate the transmission beam to be used by the second device in following manners.

(1) transmitting, by the first device, a first signaling to the second device, wherein the first signaling is used to instruct the second device to determine a transmission beam based on a current optimal reception beam of the second device or based on a reception beam used currently, and instruct the second device to transmit a reference signal by using the determined transmission beam.

(2) transmitting, by the first device, a second signaling to the second device, wherein the second signaling includes identification information of a target transmission beam, the second signaling is used to indicate the second device to determine a transmission beam based on the identification information by using an optimal reception beam corresponding to the target transmission beam, and is used to instruct the second device to transmit the reference signal by using the determined transmission beam.

The reference signal may be a pilot signal, a data signal, a data channel, or the like. The pilot signal may be a Sounding Reference Signal (SRS), or a Demodulation Reference Signal (DMRS) or the like.

Step 102: receiving the reference signal transmitted by the second device, and calculating a reception quality of the reference signal.

In a practical application, the first device may receive the reference signal transmitted by the second device in following manners.

(1) if the first device has the beam reciprocity, receiving the reference signal by using a reception beam corresponding to a current transmission beam or a reception beam corresponding to the target transmission beam indicated to the second device. Here, the reception beam corresponding to the target transmission beam refers to a reception beam having a beam reciprocity relation with the target transmission beam, that is, the reception beam may be determined based on the target transmission beam and the beam reciprocity.

(2) receiving the reference signal by using candidate reception beams at a present time point, and determining a candidate reception beam with an optimal signal quality, and receiving, by using the candidate reception beam with the optimal signal quality, the reference signal subsequently transmitted.

The optimal signal quality may refer to a highest signal power, a highest signal-to-noise ratio, etc.

(3) receiving the reference signal by using an optimal beam-training-signal reception beam; wherein the optimal beam-training-signal reception beam is a reception beam having an optimal signal quality for receiving the beam training signal.

The reception quality includes, but is not limited to, a signal reception power.

Step 103: receiving a plurality of beam training signals transmitted by the second device, and calculating reception qualities of the plurality of beam training signals, respectively.

In a practical application, the first device may receive the plurality of beam training signals in following ways.

(1) if the first device has the beam reciprocity, then receiving the beam training signals by using the reception beam corresponding to the current transmission beam or the reception beam corresponding to the target transmission beam indicated to the second device.

(2) receiving the beam training signals by using a reception beam having the optimal signal quality for receiving the reference signal.

(3) receiving the beam training signals by using candidate reception beams at a present time point, respectively, and determining a candidate reception beam having the optimal signal quality, and receiving, by using the candidate reception beam having the optimal signal quality, beam training signals transmitted subsequently.

Step 104: comparing the reception quality of the reference signal with a reference reception quality obtained based on reception qualities of the plurality of beam training signals, and determining whether the beam reciprocity of the second device is established or not based on a result of the comparison.

In this step, whether the beam reciprocity of the second device is established or not may be determined in following ways.

First way: determining a maximum reception quality among the reception qualities of the plurality of beam training signals, and taking the maximum reception quality as the reference reception quality. It is determined that the beam reciprocity of the second device is established if the reception quality of the reference signal is greater than the reference reception quality, or if difference between the reference reception quality and the reception quality of the reference signal is less than a predefined threshold; otherwise, it is determined that beam reciprocity of the second device is not established if the reception quality of the reference signal is smaller than or equal to the reference reception quality, or if difference between the reference reception quality and the reception quality of the reference signal is larger than or equal to the predefined threshold.

Second way: sorting the reception qualities of the plurality of beam training signals in a descending order, and selecting reception qualities of top K beam training signals in a sorting result, wherein K is an integer greater than 1; calculating an average value (or another operational value such as a geometric mean value or the like) of the reception qualities of the K beam training signals, and taking the average value as the reference reception quality. It is determined that the beam reciprocity of the second device is established if the reception quality of the reference signal is greater than the reference reception quality, or if the difference between the reference reception quality and the reception quality of the reference signal is less than the predefined threshold; otherwise, it is determined that beam reciprocity of the second device is not established if the reception quality of the reference signal is smaller than or equal to the reference reception quality, or if the difference between the reference reception quality and the reception quality of the reference signal is larger than or equal to the predefined threshold.

In the above embodiment, in order to further improve the communication quality, before the step 102, the method may further include instructing the second device to transmit the plurality of beam training signals. In such a case, the step 103 specifically includes receiving the plurality of beam training signals transmitted by the second device according to the instruction.

After determining whether the second device has the beam reciprocity or not, a result of the determination may also be transmitted to the second device.

Specifically, if it is determined that the beam reciprocity of the second device is established, the first device transmits first indication information to the second device, wherein the first indication information is used to instruct that the second device is to transmit data by using a reciprocal beam.

If it is determined that beam reciprocity of the second device is not established, the first device transmits second indication information to the second device, wherein the second indication information is used to indicate that the second device is to transmit data by using a first designated transmission beam.

The first device transmits third indication information to the second device if it is determined that the second device transmits data by using a beam indicated by the first device and that the beam reciprocity of the second device is established, wherein the third indication information is used to indicate that the second device is to transmit data by using a reciprocal beam.

The first device transmits fourth indication information to the second device if it is determined that the second device transmits data using the beam indicated by the first device and that the beam reciprocity of the second device is not established, wherein the fourth indication information is used to indicate that the second device is to transmit data by using a second designated transmission beam.

The second indication information includes an identifier of the first designated transmission beam for instructing that the second device is to transmit data by using the first designated transmission beam. The fourth indication information includes an identifier of the second designated transmission beam. The first designated transmission beam and the second designated transmission beam may be any transmission beam selected by the first device or a transmission beam determined based on a reception quality.

As may be seen from the above, based on a technical scheme of some embodiments of the present disclosure, the first device may accurately determine whether the beam reciprocity of the second device is established or not, so that the corresponding beam may be accurately selected for data transmission, thereby improving the communication quality.

In the embodiment shown in FIG. 1, in the step 104, whether the beam reciprocity of the second device is established or not may be determined by the first device in the manner described above. Whether the beam reciprocity of the second device is established or not may also be determined by the second device in manners described below.

(1) transmitting, by the first device to the second device, the reception quality of the reference signal and the reference reception quality obtained based on the reception qualities of the plurality of beam training signals, so that the second device compares the reception quality of the reference signal with the reference reception quality obtained based on the reception qualities of the plurality of beam training signals, and determines whether the beam reciprocity of the second device is established or not based on a result of the comparison.

(2) comparing, by the first device, the reception quality of the reference signal with the reference reception quality obtained based on the reception qualities of the plurality of beam training signals, and transmitting a result of the comparison to the second device, so that the second device determines whether the beam reciprocity of the second device is established or not based on the result of the comparison.

A method of determining whether the beam reciprocity is established or not by the second device may be obtained by referring to two ways in step 104.

Figure 2:
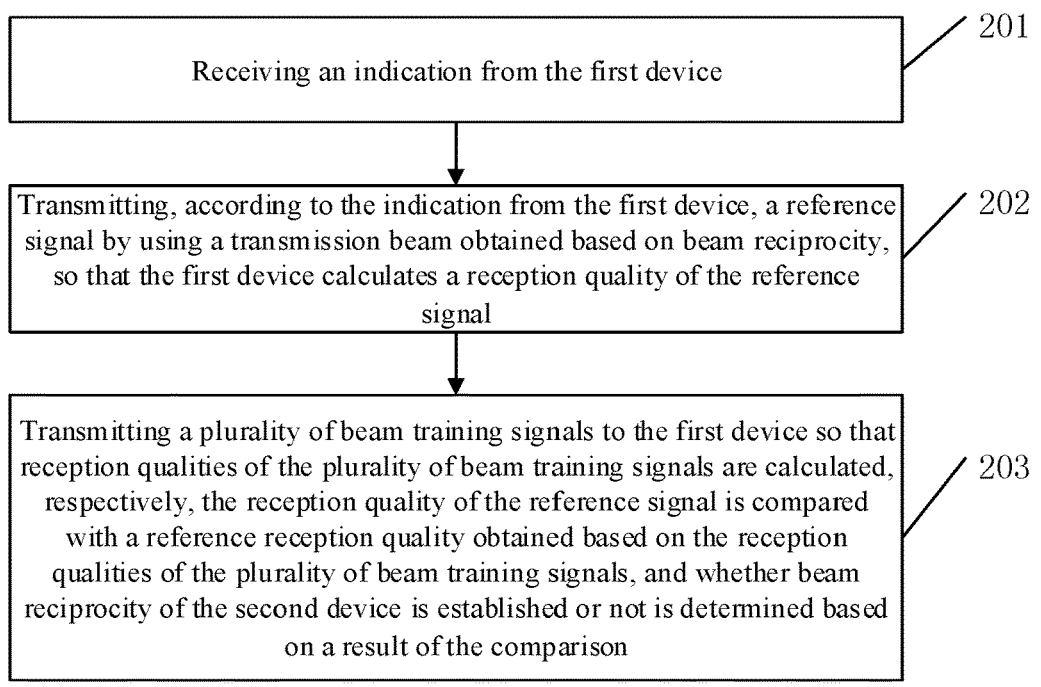
FIG. 2 is a second flow diagram of a method of determining beam reciprocity of a device according to some embodiments of the present disclosure.

As shown in FIG. 2, the method of determining beam reciprocity of a device according to some embodiments of the present disclosure is provided. The method is applied to a second device. The method includes following steps 201-203.

Step 201: receiving an indication from the first device.

Step 202: transmitting, according to the indication from the first device, a reference signal by using a transmission beam obtained based on beam reciprocity, so that the first device calculates a reception quality of the reference signal.

Specifically, in this step, the second device receives a first signaling from the first device, determines, according to the first signaling, a transmission beam by using a current optimal reception beam or a reception beam used currently, and transmits the reference signal by using the determined transmission beam; or the second device receives a second signaling from the first device, the second signaling including identification information of a target transmission beam, the second device determines, based on the identification information, a transmission beam by using an optimal reception beam for receiving the target transmission beam, and transmits the reference signal by using the determined transmission beam.

Step 203: transmitting a plurality of beam training signals to the first device so that reception qualities of the plurality of beam training signals are calculated, respectively, the reception quality of the reference signal is compared with a reference reception quality obtained based on the reception qualities of the plurality of beam training signals, and whether beam reciprocity of the second device is established or not is determined based on a result of the comparison.

In this step, the second device may also firstly receive from the first device an indication for transmitting the plurality of beam training signals, and then transmit the plurality of beam training signals to the first device according to the indication.

In order to further improve the communication quality, the method in the embodiment of the present disclosure may further include: receiving first indication information from the first device and transmitting, according to the first indication information, data by using a reciprocal beam, wherein the first indication is transmitted by the first device when the first device determines that the beam reciprocity of the second device is established; or receiving second indication information from the first device, and transmitting, according to the second indication information, data by using a first designated transmission beam, wherein the second indication information is transmitted by the first device when the first device determines that beam reciprocity of the second device is not established, the second indication information includes an identifier of the first designated transmission beam for instructing that the second device is to transmit data by using the first designated transmission beam; or receiving third indication information from the first device, and transmitting, according to the third indication information, data by using a reciprocal beam, wherein the third indication information is transmitted by the first device when the first device determines that beam reciprocity of the second device is established and the second device transmits data by using a beam indicated by the first device; or receiving fourth indication information from the first device and transmitting, according to the fourth indication information, data by using a second designated transmission beam, wherein the fourth indication information is transmitted by the first device when the first device determines that beam reciprocity of the second device is not established and the second device transmits data by using a beam indicated by the first device. The fourth indication information further includes an identifier of a second designated transmission beam; in such a case, the second device transmits, according to the fourth indication information, data by using the second designated transmission beam corresponding to the identifier of the second designated transmission beam.

As may be seen from the above, through the technical scheme of some embodiments of the present disclosure, the first device may accurately determine whether the beam reciprocity of the second device is established or not, so that a corresponding beam may be accurately selected for transmitting data, thereby improving the communication quality.

In the embodiment shown in FIG. 2, whether the beam reciprocity of the second device is established or not may be determined in following manners.

(1) transmitting, by the second device, a plurality of beam training signals to the first device such that the first device calculates reception qualities of the plurality of beam training signals, respectively, compares a reception quality of the reference signal with a reference reception quality obtained based on the reception qualities of the plurality of beam training signals, and determines whether the beam reciprocity of the second device is established or not based on a result of the comparison.

(2) transmitting, by the second device, a plurality of beam training signals to the first device such that the first device calculates reception qualities of the plurality of beam training signals, respectively, transmits to the second device a reception quality of the reference signal and a reference reception quality obtained based on the reception qualities of the plurality of beam training signals, and the second device compares the reception quality of the reference signal with the reference reception quality obtained based on the reception qualities of the plurality of beam training signals, and determines whether the beam reciprocity of the second device is established or not based on a result of the comparison.

(3) transmitting, by the second device, a plurality of beam training signals to the first device so that the first device calculates reception qualities of the plurality of beam training signals, respectively, compares the reception quality of the reference signal with the reference reception quality obtained based on the reception qualities of the plurality of beam training signals, and transmits a result of the comparison to the second device, the second device determines, based on the result of the comparison, whether the beam reciprocity of the second device is established or not.

The method of determining whether the beam reciprocity of the second device is established or not may be obtained by referring to two ways in step 104.

In the embodiment of the present disclosure, an implementation procedure of the method of determining the beam reciprocity for a device according to some embodiments of the present disclosure is describe below by taking as an example a case that the first device is a base station and the second device is a terminal.

Figure 3:
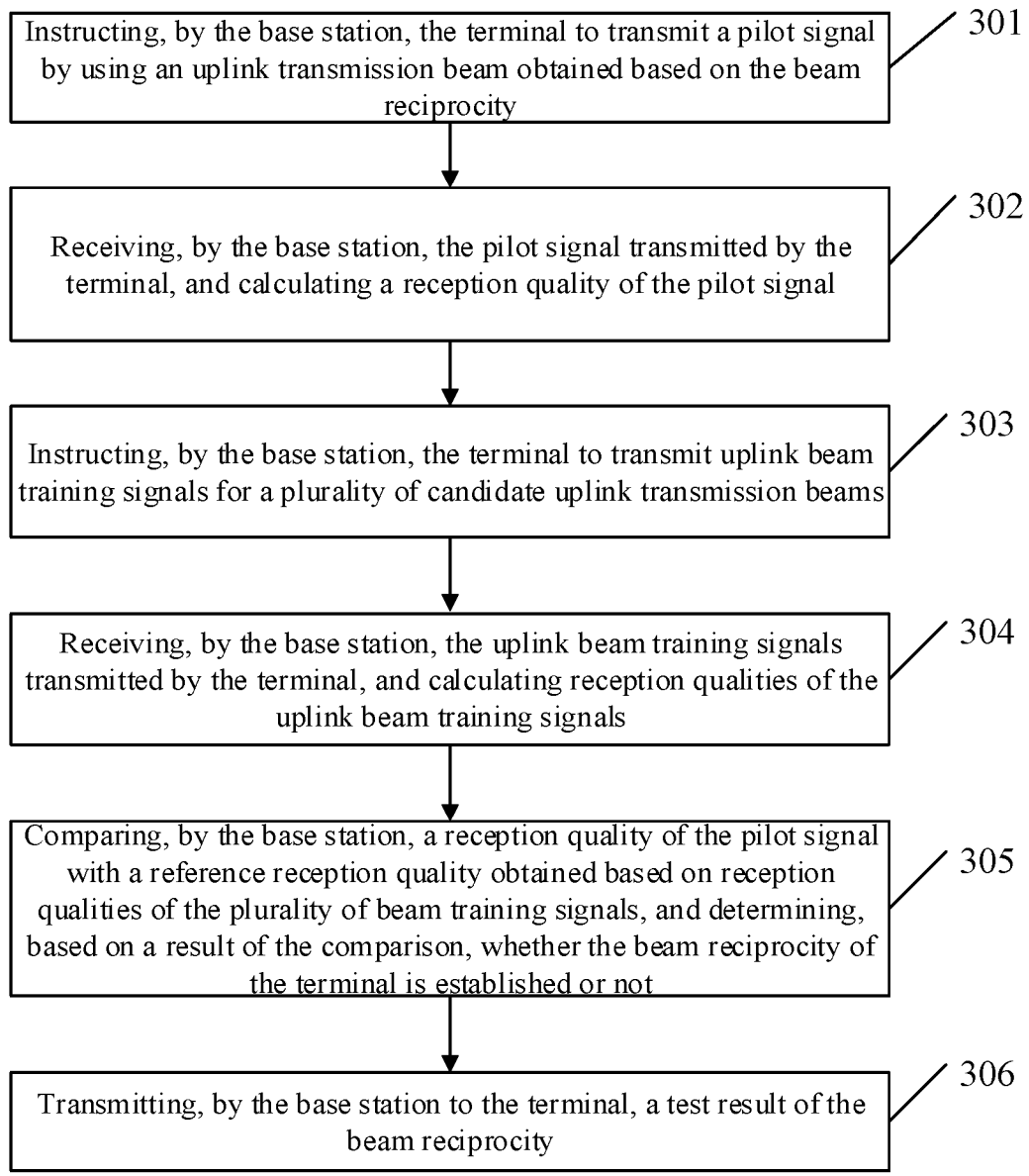
FIG. 3 is a third flow diagram of a method of determining beam reciprocity of a device according to some embodiments of the present disclosure.

As shown in FIG. 3, the method of determining beam reciprocity of a device according to some embodiments of the present disclosure includes steps 301-306.

Step 301: instructing, by the base station, the terminal to transmit a pilot signal by using an uplink transmission beam obtained based on the beam reciprocity. The base station may indicate through following manners how the terminal determines the uplink transmission beam.

(a) indicating, by the base station, (e.g., the base station may indicate through a signaling) the terminal to calculate the uplink transmission beam by using a current optimal downlink reception beam of the terminal or the downlink reception beam used currently.

(b) transmitting, by the base station, a signaling to the terminal, wherein the signaling includes identification information of a downlink transmission beam for instructing the terminal to calculate the uplink transmission beam by using an optimal downlink reception beam for receiving the downlink transmission beam.

The identification information of the downlink transmission beam carried in the signaling may be referred to as an identifier of a target downlink transmission beam. The target downlink transmission beam may be a downlink transmission beam having the optimal signal quality determined by the base station based on a measurement and a reporting from the terminal. In a practical application, the identification information of the downlink transmission beam may be a beam number of the downlink transmission beam in the system, or may be a resource identifier of a downlink reference signal (such as a Channel State Information Reference Signal (CSI-RS)) transmitted by the base station.

A beam reciprocity of a transmission beam and a reception beam means that transmission and reception performed by a device may use a same set of beamforming weights to generate the transmission beam or the reception beam directed to a same direction; or the transmission beam and the reception beam have an established correspondence relation, that is, if a reception beam for a terminal or a base station is determined, a transmission beam for the terminal or the base station may be determined based on the correspondence relation; vice versa, i.e. if a transmission beam for the terminal or the base station is determined, a reception beam for the terminal or the base station may be determined based on the correspondence relation.

In this step, the pilot signal may be a Sounding Reference Signal (SRS), a Demodulation Reference Signal (DMRS), or the like.

Step 302: receiving, by the base station, the pilot signal transmitted by the terminal, and calculating a reception quality of the pilot signal.

The reception quality may be a signal reception power or the like.

In this step, a uplink reception beam of the base station receiving the pilot signal is:

(1) if the beam reciprocity of the base station is established, receiving, by the base station, the pilot signal by using an uplink reception beam corresponding to a current downlink transmission beam or an uplink reception beam corresponding to a downlink transmission beam indicated in the signaling in step 301.

(b) selecting, by the base station among candidate uplink reception beams, an uplink reception beam for receiving the pilot signal.

Assuming that the base station has $N_R^{BS}$ candidate uplink reception beams, each of the uplink reception beams corresponds to a set of beamforming weights, and beamforming weights of a n-th one of the candidate uplink reception beams is $U_n = [u_1^n \ u_2^n \ \ldots \ u_K^n]^T$ where K is the number of antenna oscillators in the beamforming and may be less than the number of antenna oscillators of the base station.

The base station may respectively attempt to receive the pilot signal transmitted by the terminal by using each of the candidate uplink reception beams, and then select the candidate uplink reception beam having the optimal signal quality as the uplink reception beam finally used to receive the pilot signal.

c) if the method according to the embodiments of the present disclosure is not performed for the first time, the uplink reception beam having the optimal signal quality for receiving the uplink beam training signals may also be selected for receiving the pilot signal, according to the result obtained by performing the method in the embodiments of the method last time.

The optimal signal quality may refer to the highest signal power, the highest signal-to-noise ratio, etc.

Step 303: instructing, by the base station, the terminal to transmit uplink beam training signals for a plurality of candidate uplink transmission beams.

The number of candidate uplink transmission beams that the terminal may transmit depends on hardware capability of the terminal. Assuming that the terminal has $N_T^{UE}$ candidate uplink transmission beams, each of the candidate uplink transmission beams corresponds to a set of beamforming weights, and the beamforming weights of the n-th one of the candidate uplink transmission beams are $Z_n = [z_1^n \ z_2^n \ \ldots \ z_L^n]^T$, where K is the number of antenna oscillators of the beamforming and may be less than the number of antenna oscillators of the base station.

The terminal may transmit a beam training signal for each candidate uplink transmission beam. For example, the terminal may transmit $N_T^{UE}$ training signals for $N_T^{UE}$ uplink transmission beams. The $N_T^{UE}$ training signals may be combined in a Time-Division Multiplexing (TDM) manner, a Frequency Division Multiplexing (FDM) manner, a Code Division Multiplexing (CDM) manner, or a combination of various multiplexing manners.

For example, in a system based on an Orthogonal Frequency Division Multiplexing (OFDM), the $N_T^{UE}$ training signals may occupy $N_T^{UE}$ OFDM symbols, and each of the training signals occupies one OFDM symbol, the training signals may be multiplexed in the TDM manner. Of course, the uplink beam training signals for the plurality of candidate uplink transmission beams may also be transmitted in one OFDM symbol, and may be multiplexed in the FDM manner or the CDM manner.

The uplink beam training signal for each candidate uplink transmission beam is transmitted by the terminal after the uplink beam training signal is beamformed by using the beamforming weights corresponding to the candidate uplink transmission beam. The uplink beam training signal transmitted by the terminal is transmitted on resources configured by the base station, and the resources configured by the base station may be periodic resources, or aperiodic resources, or semi-persistent resources.

Step 304: receiving, by the base station, the uplink beam training signals transmitted by the terminal, and calculating reception qualities of the uplink beam training signals.

The reception quality may be a signal reception power or the like.

In a practical application, the base station receives the uplink beam training signals by using an uplink reception beam determined in following manners.

(a) receiving, by the base station, the uplink beam training signals by using the uplink reception beam determined in step 302.

(1) if the beam reciprocity of the base station is established, using, by the base station, an uplink reception beam corresponding to a current downlink transmission beam or an uplink reception beam corresponding to a downlink beam indicated in the signaling in step 301 to receive the uplink reception beam training signal.

(2) selecting, by the base station, an uplink reception beam for receiving the uplink beam training signal among the candidate uplink reception beams. For example, the base station selects the candidate uplink reception beam having the optimal signal quality when receiving the pilot signal, as the uplink reception beam finally used to receive the uplink beam training signals.

(b) determining, by the base station, an uplink reception beam for receiving the uplink beam training signals through receiving the uplink beam training signals transmitted by the terminal. The uplink reception beam of the base station may be selected from the candidate uplink reception beams.

Assumed that the base station has $N_R^{BS}$ uplink reception beams, each of the uplink reception beams corresponds to a set of beamforming weights, and beamforming weights of the n-th one of the uplink reception beams is $U_n = [u_1^n\ u_2^n\ \ldots\ u_K^n]^T$, wherein K is the number of antenna oscillators of beamforming and may be smaller than the number of antenna oscillators of the base station.

The base station may attempt to receive the uplink beam training signal by using each candidate uplink reception beam, and select the candidate uplink reception beam having the optimal signal quality as the uplink reception beam for the uplink beam training signal.

Step 305: comparing, by the base station, a reception quality of the pilot signal with a reference reception quality obtained based on reception qualities of the plurality of beam training signals, and determining, based on a result of the comparison, whether the beam reciprocity of the terminal is established or not.

In this step, the base station may determine whether the beam reciprocity of the terminal is established or not in following manners.

(a) comparing, by the base station, the reception qualities of all of the uplink beam training signals, and determining a maximum value of the reception qualities which is denoted as A, wherein an uplink transmission beam corresponding to the maximum value is an optimal uplink transmission beam; a reception quality of the pilot signal transmitted by using a reciprocal beam is denoted as B.

If the reception quality of the pilot signal is greater than the maximum value (B>A) in the reception qualities of the uplink beam training signals, or if the difference between the maximum value in the reception qualities of the uplink beam training signals and the reception quality of the pilot signal is less than a predefined threshold (A−B<Threshold), the beam reciprocity of the terminal may be considered to be established; otherwise, if the reception quality of the pilot signal is smaller than or equal to the maximum value (B≤A) in the reception qualities of the uplink beam training signals, or if the difference between the maximum value in the reception qualities of the uplink beam training signals and the reception quality of the pilot signal is larger than or equal to the predefined threshold (A−B≥Threshold), the beam reciprocity of the terminal may be considered to not be established, wherein the threshold may be set empirically.

(b) sorting, by the base station, the reception qualities of all of the uplink beam training signals in a descending order, and selecting reception qualities (denoted as A1, A2, . . . , AK) of top K uplink beam training signals in a sorting result; the reception quality of the pilot signal transmitted by using a reciprocal beam is denoted as B, wherein K is arbitrarily selected, for example an integer greater than 1.

An average value (or another operational value such as a geometric mean value or the like) of the reception qualities of the K uplink beam training signals may be calculated. The average value may be used herein as the reference reception quality.

If the reception quality of the pilot signal is greater than the average value of the reception qualities of the K uplink beam training signals (i.e., the reference reception quality) (B>[A1+A2+ . . . +AK]/K), or if the difference between the average value (or another operational value such as the geometric mean value) of the reception qualities of the K uplink beam training signals and the reception quality of the pilot signal is less than a predefined threshold value ([A1+A2+ . . . +AK]/K−B<Threshold), then the beam reciprocity of the terminal may be considered to be established; otherwise, if the reception quality of the pilot signal is smaller than or equal to the average value of the reception qualities of the K uplink beam training signals (i.e., the reference reception quality) (B≤[A1+A2+ . . . +AK]/K), or if the difference between the average value (or another operational value such as the geometric mean value) of the reception qualities of the K uplink beam training signals and the reception quality of the pilot signal is larger than or equal to the predefined threshold value ([A1+A2+ . . . +AK]/K−B≥Threshold), the beam reciprocity of the terminal may be considered to not be established, wherein the threshold may be set empirically.

Step 306: transmitting, by the base station to the terminal, a test result of the beam reciprocity, i.e., informing to the terminal whether the beam reciprocity of the terminal is established or not.

In the embodiments of the present disclosure, the base station may inform the terminal in different ways according to whether the terminal performs transmission by using the reciprocal beam.

(a) the terminal performs transmission by using a reciprocal beam.

In practical applications, the base station may determine, based on the result of performing the embodiment of the present disclosure in the past or a predetermined judgment, whether or not the terminal performs transmission by using the reciprocity beam.

(1) if the beam reciprocity of the terminal is established, transmitting, by the base station to the terminal, first indication information for instructing the terminal to perform transmission by using the reciprocity beam; or, not transmitting, by the base station to the terminal may, a test result, wherein the terminal may by default continue, according to a prior agreement, to perform transmission by using the reciprocity beam.

(2) if the beam reciprocity of the terminal is not established, transmitting, by the base station to the terminal, second indication information for instructing the terminal to performs transmission by using a designated uplink transmission beam, wherein the second indication information may include an identifier used to indicate an uplink transmission beam (i.e., a designated uplink transmission beam) to be used by the terminal, and the second indication information is used to indicate the uplink transmission beam to be used by the terminal. The identifier may be an identifier of an uplink beam training signal. After the terminal receives the instruction, the terminal may stop transmission performed by using the reciprocity beam and instead, transmit data by using the designated uplink transmission beam.

(b) the terminal transmits data currently by using a beam indicated by the base station.

(1) if the beam reciprocity of the terminal is established, transmitting, by the base station to the terminal, third indication information for instructing the terminal that the beam reciprocity of the terminal is established, wherein the terminal may perform transmission by using the reciprocal beam.

(2) if the beam reciprocity of the terminal is not established, transmitting, by the base station to the terminal, fourth indication information, wherein the fourth indication information may include indication information for an uplink transmission beam and is used to indicate the uplink transmission beam to be used by the terminal. The fourth indication information may be an identifier of the uplink beam training signal. Of course, in such a case, the base station may also not transmit instruction information to the terminal, and the terminal may, according to a predefined agreement, continue to perform uplink data transmission by using a current uplink transmission beam.

In the above process, a testing procedure of the beam reciprocity of the terminal performed by the base station may be performed periodically, or may be triggered by the base station and performed aperiodically.

As may be seen from the above, through the technical scheme of some embodiments of the present disclosure, the base station may accurately determine whether the beam reciprocity of the terminal is established or not, so that a corresponding beam may be accurately selected for transmitting data, thereby improving the communication quality.

In some embodiments of that present disclosure, an implementation procedure of a method of determining beam reciprocity of a device according to some embodiments of the present disclosure is described below by taking as an example a case in which the first device is the terminal and the second device is the base station. A principle of this embodiment is the same as that of the embodiment shown in FIG. 3, difference between this embodiment and the embodiment shown in FIG. 3 is that a transmission direction is different.

Figure 4:
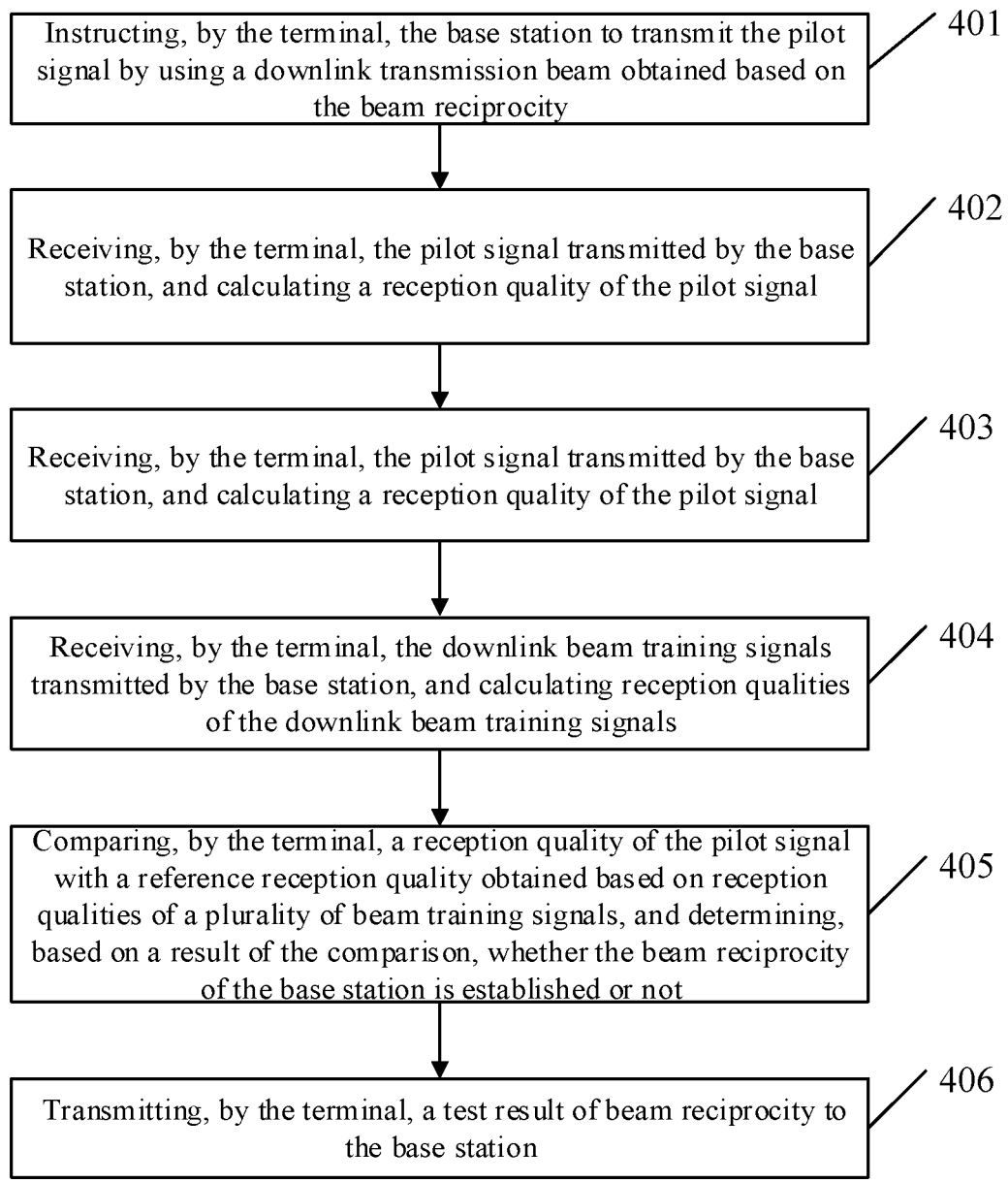
FIG. 4 is a fourth flowchart of a method of determining beam reciprocity of a device according to some embodiments of the present disclosure.

As shown in FIG. 4, the method of determining beam reciprocity of a device according some embodiments of the present disclosure includes following steps 401-406.

Step 401: instructing, by the terminal, the base station to transmit the pilot signal by using a downlink transmission beam obtained based on the beam reciprocity. The terminal may indicate the base station how to determine the downlink transmission beam in following manners.

(a) indicating, by the terminal (e.g., indicating by signaling), the base station to calculate the downlink transmission beam by using a current optimal uplink reception beam of the base station or by using an uplink reception beam currently used.

(b) transmitting, by the terminal, a signaling to the base station, wherein the signaling includes identification information of an uplink transmission beam and is used to instruct the base station to calculate the downlink transmission beam by using an optimal uplink reception beam for receiving the uplink transmission beam.

Step 402: receiving, by the terminal, the pilot signal transmitted by the base station, and calculating a reception quality of the pilot signal.

The reception quality may be a signal reception power or the like.

In this step, a downlink reception beam by which the terminal receives the pilot signal is determined as follow.

(a) if the beam reciprocity of the terminal is established, receiving, by the terminal, the pilot signal by using a downlink reception beam corresponding to a current uplink transmission beam or a downlink reception beam corresponding to an uplink transmission beam indicated in the signaling in step 401.

(b) selecting, by the terminal among candidate downlink reception beams, a downlink reception beam for receiving the pilot signal.

The terminal may respectively attempt to receive the pilot signal transmitted by the base station, by using each of the candidate downlink reception beams, and then select a candidate downlink reception beam having the optimal signal quality as the downlink reception beam finally used to receive the pilot signal.

c) if the method in the embodiment of the present disclosure is not performed for the first time, the downlink reception beam having the optimal signal quality for receiving beam training signals may also be selected for receiving the pilot signal, according to the result obtained by performing the method in the embodiment of the method last time.

Step 403: instructing, by the terminal, the base station to transmit downlink beam training signals for a plurality of candidate downlink transmission beams.

Step 404: receiving, by the terminal, the downlink beam training signals transmitted by the base station, and calculating reception qualities of the downlink beam training signals.

The reception quality may be a signal reception power or the like.

In a practical application, the terminal receives the downlink beam training signals by using downlink reception beams determined in following manners.

(a) receiving, by the terminal, the downlink beam training signals by using the downlink reception beam determined in step 402.

(1) if the beam reciprocity of the terminal is established, receiving, by the terminal, the downlink beam training signals by using a downlink reception beam corresponding to the current uplink transmission beam or a downlink reception beam corresponding to the uplink transmission beam indicated in the signaling in step 401.

(2) selecting, by the terminal among the candidate downlink reception beams, the downlink reception beam for receiving the downlink beam training signals. For example, the terminal selects the candidate downlink reception beam having the optimal signal quality when receiving the pilot signal, as the downlink reception beam finally used to receive the downlink beam training signals.

(b) determining, by the terminal, the downlink reception beam for receiving the downlink beam training signals by receiving the downlink beam training signals transmitted by the base station. The downlink reception beam of the terminal may be selected from the candidate downlink reception beams.

The terminal may attempt to receive a downlink beam training signal through each of the candidate downlink reception beams, and select the candidate downlink reception beam having the optimal signal quality as the downlink reception beam for receiving the downlink beam training signal.

Step 405: comparing, by the terminal, a reception quality of the pilot signal with a reference reception quality obtained based on reception qualities of a plurality of beam training signals, and determining, based on a result of the comparison, whether the beam reciprocity of the base station is established or not.

In this step, the terminal may determine whether the beam reciprocity of the base station is established or not in following manners.

(a) comparing, by the terminal, the reception qualities of all of the plurality of downlink beam training signals, and determining a maximum value of the reception qualities which is denoted as A, wherein the downlink transmission beam corresponding to the maximum value is an optimal downlink transmission beam; the reception quality of the pilot signal transmitted using a reciprocal beam is denoted as B.

If the reception quality of the pilot signal is larger than the maximum value (B>A) of the reception qualities of the downlink beam training signals, or if the difference between the maximum value of the reception qualities of the downlink beam training signals and the reception quality of the pilot signal is less than a predefined threshold (A−B<Threshold), then the beam reciprocity of the base station may be considered to be established; otherwise, if the reception quality of the pilot signal is smaller than or equal to the maximum value (B≤A) of the reception qualities of the downlink beam training signals, or if the difference between the maximum value of the reception qualities of the downlink beam training signals and the reception quality of the pilot signal is larger than or equal to a predefined threshold (A−B≥Threshold), the beam reciprocity of the base station is considered to not be established. Wherein the threshold may be set empirically.

(b) sorting, by the terminal, the reception qualities of all of the plurality of downlink beam training signals in a descending order, and selects reception qualities s (denoted as A1, A2, . . . , AK) of top K downlink beam training signals in a sorting result; the reception quality of the pilot signal transmitted using the reciprocal beam is denoted as B, wherein K is arbitrarily selected, for example an integer greater than 1.

An average value (or another operational value such as a geometric mean value or the like) of the reception qualities of the K downlink beam training signals may be calculated. The average value may be used herein as the reference reception quality.

If the reception quality of the pilot signal is greater than the average value of the reception qualities of the K downlink beam training signals (i.e., the reference reception quality) (B>[A1+A2+ . . . +AK]/K), or if the difference between the average value (or another operational value such as the geometric mean value) of the reception qualities of the K downlink beam training signals and the reception quality of the pilot signal is less than a predefined threshold value ([A1+A2+ . . . +AK]/K−B<Threshold), then the beam reciprocity of the base station may be considered to be established; otherwise, if the reception quality of the pilot signal is smaller than or equal to the average value of the reception qualities of the K downlink beam training signals (i.e., the reference reception quality) (B≤[A1+A2+ . . . +AK]/K), or if the difference between the average value (or another operational value such as the geometric mean value) of the reception qualities of the K downlink beam training signals and the reception quality of the pilot signal is larger than or equal to the predefined threshold value ([A1+A2+ . . . +AK]/K−B≥Threshold), the beam reciprocity of the base station may be considered to not be established, wherein the threshold may be set empirically.

Step 406: transmitting, by the terminal, a test result of beam reciprocity to the base station, that is, notifying the base station whether the beam reciprocity of the base station is established or not.

In the embodiments of the present disclosure, the terminal may inform the base station in different ways according to whether the base station performs transmission by using the reciprocal beam.

(a) the base station performs transmission by using the reciprocal beam.

In practical applications, the terminal may determine, based on the result of performing the embodiment of the present disclosure in the past or based on a predetermined judgment, whether or not the base station is performing transmission by using the reciprocity beam.

(1) if the beam reciprocity of the base station is established, transmitting, by the terminal to the base station, first indication information for instructing the base station to perform transmission by using the reciprocity beam; or, not transmitting a test result by the terminal to the base station, wherein the base station may by default continue, according to a prior agreement, to perform transmission by using the reciprocity beam.

(2) if the beam reciprocity of the base station is not established, transmitting, by the terminal to the base station, second indication information for instructing the base station to perform transmission by using a designated downlink transmission beam, wherein the second indication information may include an identifier used to indicate a downlink transmission beam (i.e., the designated downlink transmission beam) to be used by the base station, and the second indication information is used to indicate the downlink transmission beam to be used by the base station. The identifier may be an identifier of a downlink beam training signal.

(b) the base station performs transmission currently by using a beam indicated by the terminal.

(1) if the beam reciprocity of the base station is established, transmitting, by the terminal to the base station, third indication information for instructing to the base station that the beam reciprocity of the base station is established, and the base station may perform transmission by using the reciprocal beam.

(2) if the beam reciprocity of the base station is not established, transmitting fourth indication information by the terminal to the base station, wherein the fourth indication information may include indication information for a downlink transmission beam and is used to indicate the downlink transmission beam to be used by the base station. The fourth indication information may be an identifier of a downlink beam training signal. Of course, in such a case, the terminal may also not transmit instruction information to the base station, and the base station may, according to a predefined agreement, continue to perform downlink data transmission by using the current downlink transmission beam.

In the above process, a testing procedure of the beam reciprocity of the base station performed by the terminal may be performed periodically, or may be triggered by the terminal and performed aperiodically.

It should be noted that, in some embodiments, step 406 may be omitted after step 405, and the terminal transmits the result of the comparison to the base station, and the base station itself determines whether the beam reciprocity of the base station is established or not; or in some embodiments, steps 405 and 406 are omitted after step 404, the terminal transmits to the base station both the obtained reception quality of the pilot signal and the reference reception quality obtained based on the reception qualities of the plurality of beam training signals, the base station compares the reception quality of the pilot signal with the reference reception quality obtained based on the reception qualities of the plurality of beam training signals and determines whether the beam reciprocity of the base station is established or. The manner in which the base station determines whether or not the beam reciprocity of the base station itself is established or not may be obtained by referring to the Embodiment 3.

As may be seen from the above, through the technical scheme of some embodiments of the present disclosure, the terminal may accurately determine whether the beam reciprocity of the base station is established or not, so that a corresponding beam may be accurately selected for transmitting data, thereby improving the communication quality.

Figure 5:
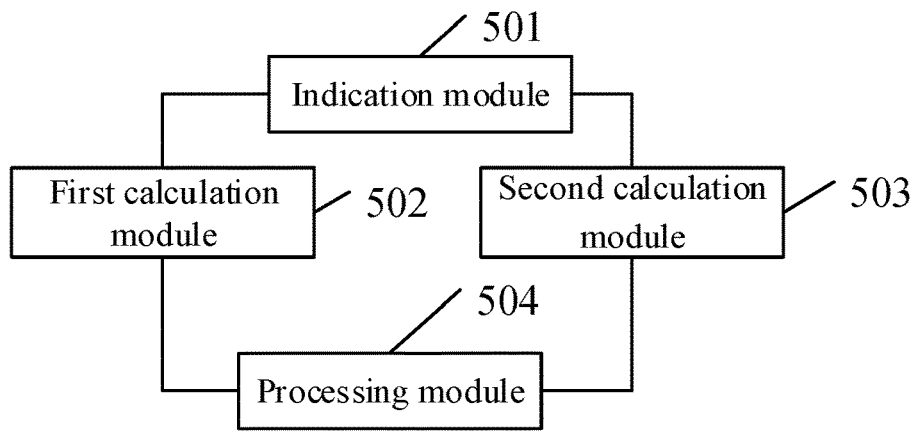
FIG. 5 is a schematic diagram of an apparatus of determining beam reciprocity of a device according to some embodiments of the present disclosure.

As shown in FIG. 5, an apparatus of determining beam reciprocity of a device according to some embodiments of the present disclosure includes an indication module 501, a first calculation module 502, a second calculation module 503, and a processing module 504.

The indication module 501 is configured to instruct a second device to transmit a reference signal by using a transmission beam obtained based on beam reciprocity. The first calculation module 502 is configured to receive the reference signal transmitted by the second device, and calculate a reception quality of the reference signal. The second calculation module 503 is configured to receive a plurality of beam training signals transmitted by the second device, and calculate reception qualities of the plurality of beam training signals, respectively. The processing module 504 is configured to compare the reception quality of the reference signal with a reference reception quality obtained based on the reception qualities of the plurality of beam training signals, and determine, based on a result of the comparison, whether the beam reciprocity of the second device is established or not.

The reference signal may be a pilot signal, a data signal, a data channel, or the like. The pilot signal may be a Sounding Reference Signal (SRS), or a Demodulation Reference Signal (DMRS) or the like.

The indication module 501 is specifically configured to: transmit a first signaling to the second device, wherein the first signaling is used to instruct the second device to determine a transmission beam based on a current optimal reception beam of the second device or based on a reception beam used currently, and instruct the second device to transmit a reference signal by using the determined transmission beam; or, transmit a second signaling to the second device, wherein the second signaling includes identification information of a target transmission beam, the second signaling is used to indicate the second device to determine a transmission beam based on the identification information by using an optimal reception beam corresponding to the target transmission beam, and is used to instruct the second device to transmit the reference signal by using the determined transmission beam.

The first calculation module 502 includes a first reception submodule and a first calculation submodule. The first reception submodule is configured to: if beam reciprocity exists, receive the reference signal by using a reception beam corresponding to a current transmission beam or a reception beam corresponding to the target transmission beam indicated to the second device; or, receive the reference signal by using candidate reception beams at a present time point, and determine a candidate reception beam having an optimal signal quality, and receive, by using the candidate reception beam having the optimal signal quality, the reference signal subsequently transmitted; or, receive the reference signal by using an optimal beam-training-signal reception beam; wherein the optimal beam-training-signal reception beam is a reception beam having an optimal signal quality for receiving the beam training signal. The first calculation submodule is configured to calculate a reception quality of the reference signal.

The second calculation module 503 includes a second reception submodule and a second calculation submodule. The second reception submodule is configured to: if beam reciprocity exists, receive the beam training signals by using a reception beam corresponding to a current transmission beam or a reception beam corresponding to the target transmission beam indicated to the second device; or, receive the beam training signals by using a reception beam having the optimal signal quality for receiving the reference signal; or, receive the beam training signals by using candidate reception beams at a present time point, respectively, and determine a candidate reception beam having an optimal signal quality, and receive, by using the candidate reception beam having the optimal signal quality, beam training signals transmitted subsequently. The second calculation submodule is configured to calculate reception qualities of the plurality of beam training signals, respectively.

The processing module 504 includes a first determination submodule and a second determination submodule. The first determination submodule is configured to: determine a maximum reception quality among the reception qualities of the plurality of beam training signals, and take the maximum reception quality as the reference reception quality. The second determination submodule is configured to, if the reception quality of the reference signal is greater than the reference reception quality, or if difference between the reference reception quality and the reception quality of the reference signal is less than a predefined threshold, determine that the beam reciprocity of the second device is established; otherwise, if the reception quality of the reference signal is smaller than or equal to the reference reception quality, or if difference between the reference reception quality and the reception quality of the reference signal is larger than or equal to the predefined threshold, determine that beam reciprocity of the second device is not established.

Optionally, the processing module 504 includes a sort submodule, a calculation submodule, a third determination and submodule.

The sort submodule is configured to sort the reception qualities of the plurality of beam training signals in a descending order, and select reception qualities of top K beam training signals in a sorting result, wherein K is an integer greater than 1. The calculation submodule is configured to calculate an average value of the reception qualities of the K beam training signals, and take the average value as the reference reception quality. The third determination submodule is configured to, if the reception quality of the reference signal is greater than the reference reception quality, or if the difference between the reference reception quality and the reception quality of the reference signal is less than the predefined threshold, determine the beam reciprocity of the second device is established; otherwise, if the reception quality of the reference signal is smaller than or equal to the reference reception quality, or if the difference between the reference reception quality and the reception quality of the reference signal is larger than or equal to the predefined threshold, determine that beam reciprocity of the second device is not established.

In order to further improve communication efficiency, the indication module 501 is further configured to instruct the second device to transmit the plurality of beam training signals. In such a case, the first calculation module 502 is specifically configured to, when receiving the plurality of beam training signals transmitted by the device, receive the plurality of beam training signals transmitted according to the instruction by the second device.

Figure 6:
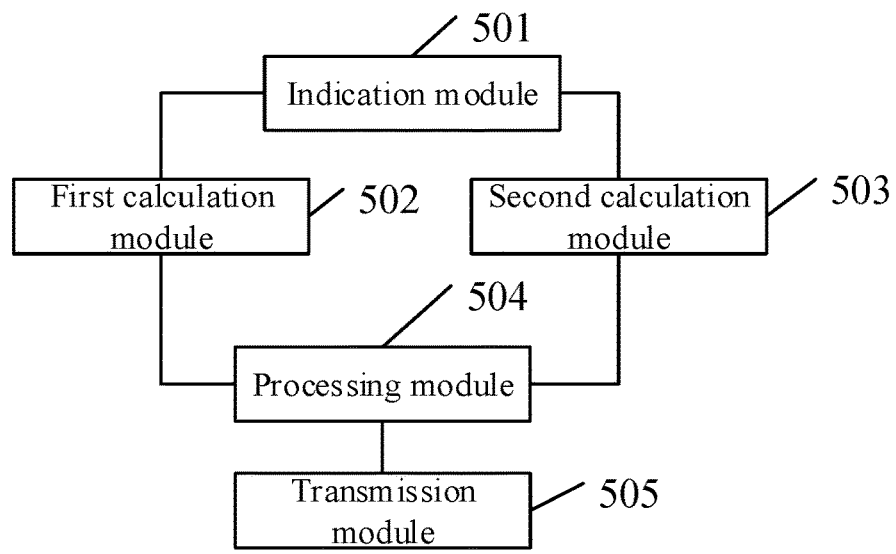
FIG. 6 is a structural schematic diagram of an apparatus of determining beam reciprocity of a device according to some embodiments of the present disclosure.

As shown in FIG. 6, in order to further improve a communication quality, the apparatus further includes a transmission module 505. The transmission module 505 is configured to: if the beam reciprocity of the second device is determined to be established, transmit first indication information to the second device, wherein the first indication information is used to instruct that the second device is to transmit data by using a reciprocal beam; or if the beam reciprocity of the second device is determined to not be established, transmit second indication information to the second device, wherein the second indication information is used to indicate that the second device is to transmit data by using a first designated transmission beam; or if the second device is determined to transmit data by using a beam indicated to the second device and the beam reciprocity of the second device is determined to be established, transmit third indication information to the second device, wherein the third indication information is used to indicate that the second device is to transmit data by using a reciprocal beam; or if the second device is determined to transmit data by using the beam indicated to the second device and the beam reciprocity of the second device is determined to not be established, transmit fourth indication information to the second device, wherein the fourth indication information is used to indicate that the second device is to transmit data by using a second designated transmission beam.

The second indication information includes an identifier of the first designated transmission beam for instructing that the second device is to transmit data by using the first designated transmission beam. The fourth indication information includes an identifier of the second designated transmission beam.

In a practical application, the processing module 504 may be specifically configured to: transmit to the second device the reception quality of the reference signal and the reference reception quality obtained based on the reception qualities of the plurality of beam training signals, so that the second device compares the reception quality of the reference signal with the reference reception quality obtained based on the reception qualities of the plurality of beam training signals, and determines, based on a result of the comparison, whether the beam reciprocity of the second device is established or not; or, compare the reception quality of the reference signal with the reference reception quality obtained based on the reception qualities of the plurality of beam training signals, and transmit a result of the comparison to the second device, so that the second device determines, based on the result of the comparison, whether the beam reciprocity of the second device is established or not.

An operational principle of the apparatus of the present disclosure may be obtained by referring to the foregoing process embodiments.

As may be seen from the above, based on the technical scheme of some embodiments of the present disclosure, the first device may accurately determine whether the beam reciprocity of the second device is established or not, so that the corresponding beam may be accurately selected for data transmission, thereby improving the communication quality.

Figure 7:
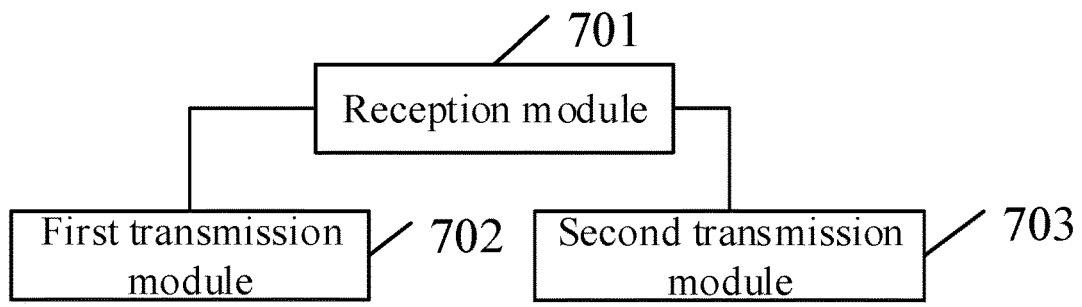
FIG. 7 is another schematic diagram of an apparatus of determining beam reciprocity of a device according to some embodiments of the present disclosure.

As shown in FIG. 7, an apparatus of determining beam reciprocity of a device according to some embodiments of the present disclosure includes a reception module 701, a first transmission module 702, and a second transmission module 703.

The reception module 701 is configured to receive an indication from the first device. The first transmission module 702 is configured to transmit, according to the indication from the first device, a reference signal by using a transmission beam obtained based on beam reciprocity, so that the first device calculates a reception quality of the reference signal. The second transmission module 703 is configured to transmit a plurality of beam training signals to the first device so that reception qualities of the plurality of beam training signals are calculated respectively, a reception quality of the reference signal is compared with a reference reception quality obtained based on the reception qualities of the plurality of beam training signals, and whether beam reciprocity of the second device is established or not is determined based on a result of the comparison.

The first transmission module 702 is specifically configured to: receive a first signaling from the first device, determine, according to the first signaling, a transmission beam by using a current optimal reception beam or a reception beam used currently, and transmit the reference signal by using the determined transmission beam; or receive a second signaling from the first device, wherein the second signaling includes identification information of a target transmission beam; determine, based on the identification information, a transmission beam by using an optimal reception beam for receiving the target transmission beam, and transmit the reference signal by using the determined transmission beam.

In a practical application, the reception module 701 is further configured to receive from the first device an indication for transmitting a plurality of beam training signals. In such a case, the second transmission module 703 is specifically configured to: when the second transmission module 703 transmits the plurality of beam training signals to the first device, transmit the plurality of beam training signals to the first device according to the indication for transmitting the plurality of beam training signals.

Figure 8:
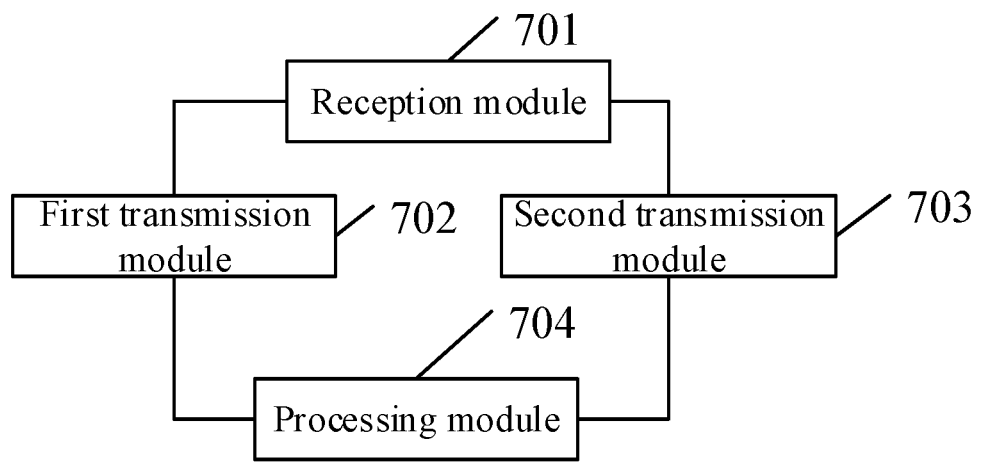
FIG. 8 is another structural diagram of an apparatus of determining beam reciprocity of a device according to some embodiments of the present disclosure.

In order to further improve the communication quality, the reception module 701 is further configured to receive a test result about the beam reciprocity of the first device. As shown in FIG. 8, the apparatus further includes a processing module 704. The processing module 704 is configured to: receive first indication information from the first device and transmit, according to the first indication information, data by using a reciprocal beam, wherein the first indication is transmitted by the first device when the first device determines that the beam reciprocity of the second device is established; or receive second indication information from the first device, and transmit, according to the second indication information, data by using a first designated transmission beam, wherein the second indication information is transmitted by the first device when the first device determines that beam reciprocity of the second device is not established; or receive third indication information from the first device, and transmit, according to the third indication information, data by using a reciprocal beam, wherein the third indication information is transmitted by the first device when the first device determines that beam reciprocity of the second device is established and the second device transmits data by using a beam indicated by the first device; or receive fourth indication information from the first device and transmit, according to the fourth indication information, data by using a second designated transmission beam, wherein the fourth indication information is transmitted by the first device when the first device determines that the beam reciprocity of the second device is not established and the second device transmits data by using a beam indicated by the first device.

In a practical application, the second transmission module 702 is specifically configured to: transmit a plurality of beam training signals to the first device such that the first device calculates reception qualities of the plurality of beam training signals, respectively, transmits to the second device a reception quality of the reference signal and a reference reception quality obtained based on the reception qualities of the plurality of beam training signals, and the second device compares the reception quality of the reference signal and the reference reception quality obtained based on the reception qualities of the plurality of beam training signals, and determines, based on a result of the comparison, whether the beam reciprocity of the second device is established or not; or the second transmission module 702 is specifically configured to: transmit the plurality of beam training signals to the first device such that the first device calculates reception qualities of the plurality of beam training signals, respectively, compares the reception quality of the reference signal with the reference reception quality obtained based on the reception qualities of the plurality of beam training signals, transmits the result of the comparison to the second device, and the second device determines, based on the result of the comparison, whether the beam reciprocity of the second device is established or not.

An operational principle of the apparatus of the present disclosure may be obtained by referring to the foregoing process embodiments.

As may be seen from the above, based on the technical scheme of some embodiments of the present disclosure, the first device may accurately determine whether the beam reciprocity of the second device is established or not, so that the corresponding beam may be accurately selected for data transmission, thereby improving the communication quality.

Figure 9:
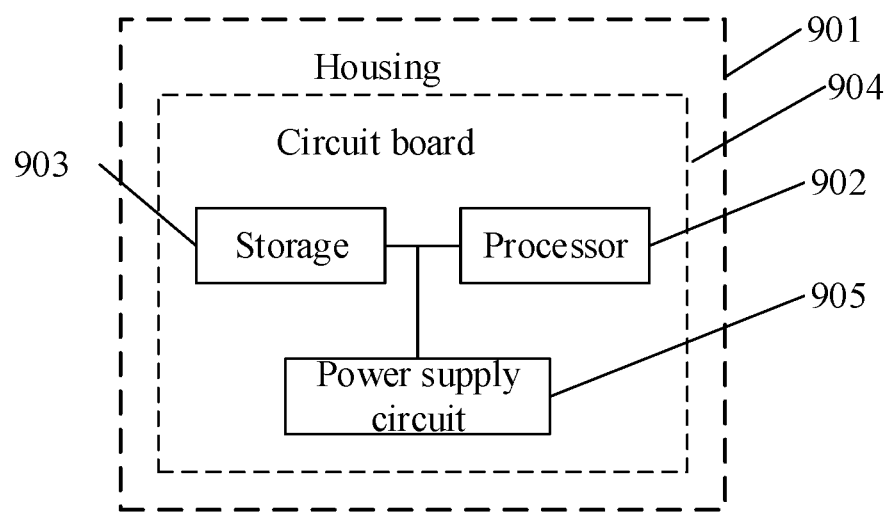
FIG. 9 is a schematic diagram of an electronic device according to some embodiments of the present disclosure.

As shown in FIG. 9, some embodiments of the present disclosure also provide an electronic device. The electronic device includes a housing 901, a processor 902, a storage 903, a circuit board 904, and a power supply circuit 905. The circuit board 904 is disposed inside space enclosed by the housing 901, and the processor 902 and the storage 903 are disposed on the circuit board 904. The power supply circuit 905 is used for supplying power to each circuit or device in the electronic device. The storage 903 is used for storing executable program codes. The processor 902 executes a program corresponding to the executable program codes by reading the executable program codes stored in the storage 903 and executes the method described in any of the foregoing embodiments.

Specific execution processes of the above steps by the processor 902 and further steps performed by the processor 902 by executing the executable program codes may be obtained by referring to foregoing description of the process embodiments, and will not be described in detail herein.

Embodiments of the present disclosure also provide a computer readable storage medium. The computer readable storage medium is used for storing computer programs. When the computer programs are executed by a processor, the processor performs the aforementioned method of determining beam reciprocity of a device.

Embodiments of the present disclosure also provide a data processing apparatus. The data processing apparatus includes a processor and a storage connected to the processor through a bus interface, wherein the storage is configured to store programs and data used by the processor when the processor performs operations, and when the processor invokes and executes the programs and data stored in the storage, the processor implements functional modules or units as follow: an indication module configured to instruct a second device to transmit a reference signal by using a transmission beam obtained based on beam reciprocity; a first calculation module configured to receive the reference signal transmitted by the second device, and calculate a reception quality of the reference signal; a second calculation module configured to receive a plurality of beam training signals transmitted by the second device, and calculate reception qualities of the plurality of beam training signals, respectively; a processing module configured to compare the reception quality of the reference signal with a reference reception quality obtained based on the reception qualities of the plurality of beam training signals, and determine, based on a result of the comparison, whether the beam reciprocity of the second device is established or not.

The embodiments of the present disclosure also provide a data processing apparatus. The data processing apparatus includes a processor and a storage connected to the processor through a bus interface, wherein the storage is configured to store programs and data used by the processor when the processor performs operations, and when the processor invokes and executes the programs and data stored in the storage, the processor implements functional modules or units as follow: a reception module configured to receive an indication from the first device; a first transmission module configured to transmit, according to the indication from the first device, a reference signal by using a transmission beam obtained based on beam reciprocity, so that the first device calculates a reception quality of the reference signal; a second transmission module configured to transmit a plurality of beam training signals to the first device so that reception qualities of the plurality of beam training signals are calculated respectively, a reception quality of the reference signal is compared with a reference reception quality obtained based on the reception qualities of the plurality of beam training signals, and whether beam reciprocity of the second device is established or not is determined based on a result of the comparison.

It should be noted that the data processing apparatus provided by some embodiments of the present disclosure is an apparatus capable of implementing the method of determining beam reciprocity of a device provided by the above-described process embodiments. Therefore, all embodiments of methods of determining beam reciprocity of a device provided by the above-described process embodiments may be adapted to this embodiment, and may achieve same or similar advantageous effects.

Figure 10:
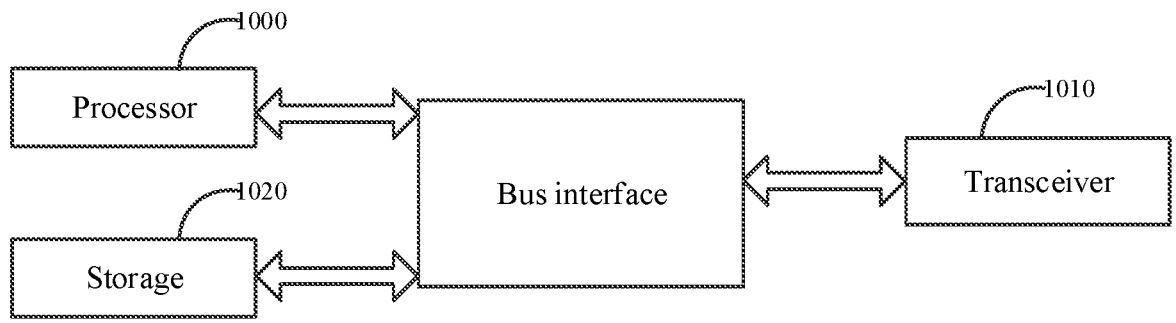
FIG. 10 is a schematic diagram of a base station according to some embodiments of the present disclosure.

As shown in FIG. 10, some embodiments of the present disclosure also provide a base station. The base station includes a processor 1000, a storage 1020, and a transceiver 1010. The processor 1000 is configured to read programs in the storage 1020, and perform following steps: instructing the terminal to transmit a reference signal by using a transmission beam obtained based on beam reciprocity; receiving the reference signal transmitted by the terminal, and calculating a reception quality of the reference signal; receiving beam training signals transmitted by the terminal, and calculating reception qualities of the beam training signals; comparing a reception quality of the reference signal with a reference reception quality obtained based on reception qualities of the plurality of beam training signals, and determining, based on a result of the comparison, whether the beam reciprocity of the terminal is established or not. The transceiver 1010 is configured to receive and transmit data under a control of the processor 1000.

In FIG. 10, a bus architecture may include any number of interconnected buses and bridges. Specifically, one or more processors such as the processor 1000 and a storage such as the storage 1020 are linked together by the bus architecture. The bus architecture may also link together various other circuits such as peripheral devices, voltage regulators, and power management circuits, etc., which are well known in the art and therefore will not be further described herein. A bus interface provides an interface. The transceiver 1010 may be a plurality of elements, including a transmitter and a receiver, configured to provide means for communicating with various other devices over a transmission medium. The processor 1000 is responsible for managing the bus architecture and general transactions, and the storage 1020 may store data used by the processor 1000 when the processor 1000 performs operations.

The processor 1000 is responsible for managing the bus architecture and general transactions, and the storage 1020 may store data used by the processor 1000 when the processor 1000 performs operations.

The processor 1000 is further configured to transmit a first signaling to the terminal, wherein the first signaling is used to instruct the terminal to determine a transmission beam based on a current optimal reception beam of the terminal or based on a reception beam used currently and instruct the terminal to transmit the reference signal by using the determined transmission beam; or, transmit a second signaling to the terminal, wherein the second signaling includes identification information of a target transmission beam, the second signaling is used to indicate the terminal to determine, based on the identification information by using an optimal reception beam corresponding to the target transmission beam, a transmission beam and is used to instruct the terminal to transmit the reference signal by using the determined transmission beam.

The processor 1000 is further configured to: if the beam reciprocity of the base station is established, receive the reference signal by using a reception beam corresponding to a current transmission beam or a reception beam corresponding to the target transmission beam indicated to the terminal; or, receive the reference signal by using candidate reception beams at a present time point, and determine a candidate reception beam having an optimal signal quality, and receive, by using the candidate reception beam having the optimal signal quality, the reference signal subsequently transmitted; or, receive the reference signal by using an optimal beam-training-signal reception beam; wherein the optimal beam-training-signal reception beam is a reception beam having an optimal signal quality for receiving the beam training signal.

The processor 1000 is further configured to: if the beam reciprocity of the base station is established, receive the beam training signals by using a reception beam corresponding to a current transmission beam or a reception beam corresponding to the target transmission beam indicated to the terminal; or, receive the beam training signals by using a reception beam having the optimal signal quality for receiving the reference signal; or, receive the beam training signals by using candidate reception beams at a present time point, respectively, and determine a candidate reception beam having an optimal signal quality, and receive, by using the candidate reception beam having the optimal signal quality, beam training signals transmitted subsequently.

The processor 1000 is further configured to: determine a maximum reception quality among the reception qualities of the plurality of beam training signals, and take the maximum reception quality as the reference reception quality; if the reception quality of the reference signal is greater than the reference reception quality, or if difference between the reference reception quality and the reception quality of the reference signal is less than a predefined threshold, determine that the beam reciprocity of the terminal is established; otherwise, if the reception quality of the reference signal is smaller than or equal to the reference reception quality, or if difference between the reference reception quality and the reception quality of the reference signal is larger than or equal to the predefined threshold, determine that beam reciprocity of the terminal is not established.

The processor 1000 is further configured to: sort the reception qualities of the plurality of beam training signals in a descending order, and select reception qualities of top K beam training signals in a sorting result, wherein K is an integer greater than 1; calculate an average value of the reception qualities of the K beam training signals, and take the average value as the reference reception quality; if the reception quality of the reference signal is greater than the reference reception quality, or if the difference between the reference reception quality and the reception quality of the reference signal is less than the predefined threshold, determine the beam reciprocity of the terminal is established; otherwise, if the reception quality of the reference signal is smaller than or equal to the reference reception quality, or if the difference between the reference reception quality and the reception quality of the reference signal is larger than or equal to the predefined threshold, determine that beam reciprocity of the terminal is not established.

The processor 1000 is further configured to: instruct the terminal to transmit the plurality of beam training signals; receiving the plurality of beam training signals transmitted by the device specifically includes receiving the plurality of beam training signals transmitted according to the instruction by the terminal.

The processor 1000 is further configured to: if the beam reciprocity of the terminal is determined to be established, transmit first indication information to the terminal, wherein the first indication information is used to instruct that the terminal is to transmit data by using a reciprocal beam; or if the beam reciprocity of the terminal is determined to not be established, transmit second indication information to the terminal, wherein the second indication information is used to indicate that the terminal is to transmit data by using a first designated transmission beam; or if the terminal is determined to transmit data by using a beam indicated by the base station and the beam reciprocity of the terminal is determined to be established, transmit third indication information to the terminal, wherein the third indication information is used to indicate that the terminal is to transmit data by using a reciprocal beam; or if the terminal is determined to transmit data by using the beam indicated by the base station and the beam reciprocity of the terminal is determined to not be established, transmit fourth indication information to the terminal, wherein the fourth indication information is used to indicate that the terminal is to transmit data by using a second designated transmission beam.

The second indication information includes an identifier of the first designated transmission beam. The fourth indication information includes an identifier of the second designated transmission beam.

Figure 11:
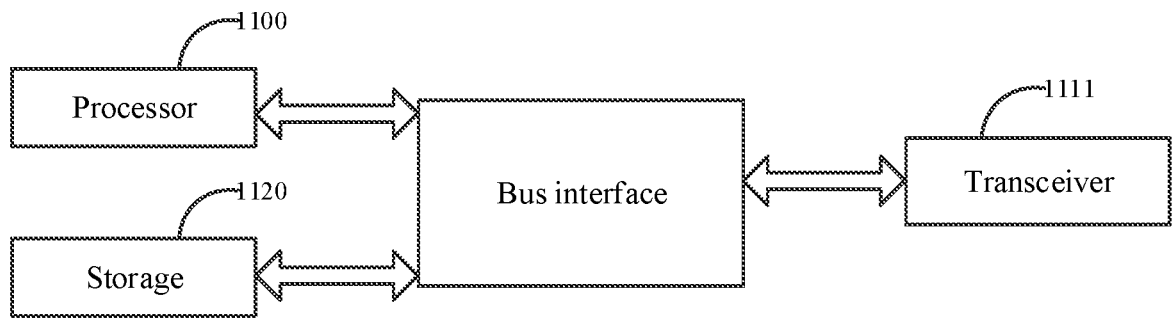
FIG. 11 is another schematic diagram of a base station according to some embodiments of the present disclosure.

As shown in FIG. 11, some embodiments of the present disclosure also provide a base station. The base station includes a processor 1100, a storage 1120, and a transceiver 1111. The processor 1100 is configured to read programs in the storage 1120 and performing steps as follow: receiving an indication from a terminal; transmitting, according to the indication from the terminal, a reference signal by using a transmission beam obtained based on beam reciprocity, so that the terminal calculates a reception quality of the reference signal; transmitting a plurality of beam training signals to the terminal so that reception qualities of the plurality of beam training signals are calculated, respectively, a reception quality of the reference signal is compared with a reference reception quality obtained based on the reception qualities of the plurality of beam training signals, and whether beam reciprocity of the base station is established or not is determined based on a result of the comparison.

The transceiver 1111 is configured to receive and transmit data under a control of the processor 1100.

In FIG. 11, a bus architecture may include any number of interconnected buses and bridges. Specifically, one or more processors such as the processor 1100 and a storage such as the storage 1120 are linked together by the bus architecture. The bus architecture may also link together various other circuits such as peripheral devices, voltage regulators, and power management circuits, etc., which are well known in the art and therefore will not be further described herein. A bus interface provides an interface. The transceiver 1111 may be a plurality of elements, including a transmitter and a receiver, configured to provide means for communicating with various other devices over a transmission medium. The processor 1100 is responsible for managing the bus architecture and general transactions, and the storage 1120 may store data used by the processor 1100 when the processor 1100 performs operations.

The processor 1100 is responsible for managing the bus architecture and general transactions, and the storage 1120 may store data used by the processor 1100 when the processor 1100 performs operations.

The processor 1100 is further configured to: receive a first signaling from the terminal, determine, according to the first signaling, a transmission beam by using a current optimal reception beam or a reception beam used currently, and transmit the reference signal by using the determined transmission beam; or receive a second signaling from the terminal, wherein the second signaling includes identification information of a target transmission beam; determine, based on the identification information, a transmission beam by using an optimal reception beam for receiving the target transmission beam, and transmit the reference signal by using the determined transmission beam.

The processor 1100 is further configured to: receive a first signaling from the terminal, determine, according to the first signaling, a transmission beam by using a current optimal reception beam or a reception beam used currently, and transmit the reference signal by using the determined transmission beam; or receive a second signaling from the terminal, wherein the second signaling includes identification information of a target transmission beam; determine, based on the identification information, a transmission beam by using an optimal reception beam for receiving the target transmission beam, and transmit the reference signal by using the determined transmission beam.

The processor 1100 is further configured to: receive from the terminal an indication for transmitting a plurality of beam training signals; transmit the plurality of beam training signals to the terminal according to the indication for transmitting the plurality of beam training signals.

The processor 1100 is further configured to: receive first indication information from the terminal and transmit, according to the first indication information, data by using a reciprocal beam, wherein the first indication is transmitted by the terminal when the terminal determines that the beam reciprocity of the base station is established; or receive second indication information from the terminal, and transmit, according to the second indication information, data by using a first designated transmission beam, wherein the second indication information is transmitted by the terminal when the terminal determines that beam reciprocity of the base station is not established; or receive third indication information from the terminal, and transmit, according to the third indication information, data by using a reciprocal beam, wherein the third indication information is transmitted by the terminal when the terminal determines that beam reciprocity of the base station is established and the base station transmits data by using a beam indicated by the terminal; or receive fourth indication information from the terminal and transmit, according to the fourth indication information, data by using a second designated transmission beam, wherein the fourth indication information is transmitted by the terminal when the terminal determines that the beam reciprocity of the base station is not established and the base station transmits data by using a beam indicated by the terminal.

The second indication information includes an identifier of the first designated transmission beam. The processor 1100 is further configured to transmit, according to the fourth indication information, data by using a second designated transmission beam corresponding to the identifier of the second designated transmission beam.

The processor 1100 is further configured to: transmit a plurality of beam training signals to the terminal so that the terminal calculates the reception qualities of the plurality of beam training signals, respectively, compares a reception quality of the reference signal with a reference reception quality obtained based on the reception qualities of the plurality of beam training signals, and determine, based on a result of the comparison, whether beam reciprocity of the base station is established or not; or transmit a plurality of beam training signals to the terminal so that the terminal calculates the reception qualities of the plurality of beam training signals, respectively, transmits, to the base station, a reception quality of the reference signal and a reference reception quality obtained based on the reception qualities of the plurality of beam training signals, the base station compares the reception quality of the reference signal with the reference reception quality obtained based on the reception qualities of the plurality of beam training signals and determines, based on a result of the comparison, whether beam reciprocity of the base station is established or not; or transmit the plurality of beam training signals to the terminal so that the terminal calculates the reception qualities of the plurality of beam training signals, respectively, compares a reception quality of the reference signal with a reference reception quality obtained based on the reception qualities of the plurality of beam training signals, and transmits a result of the comparison to the base station, the base station determines, based on a result of the comparison, whether beam reciprocity of the base station is established or not.

Figure 12:
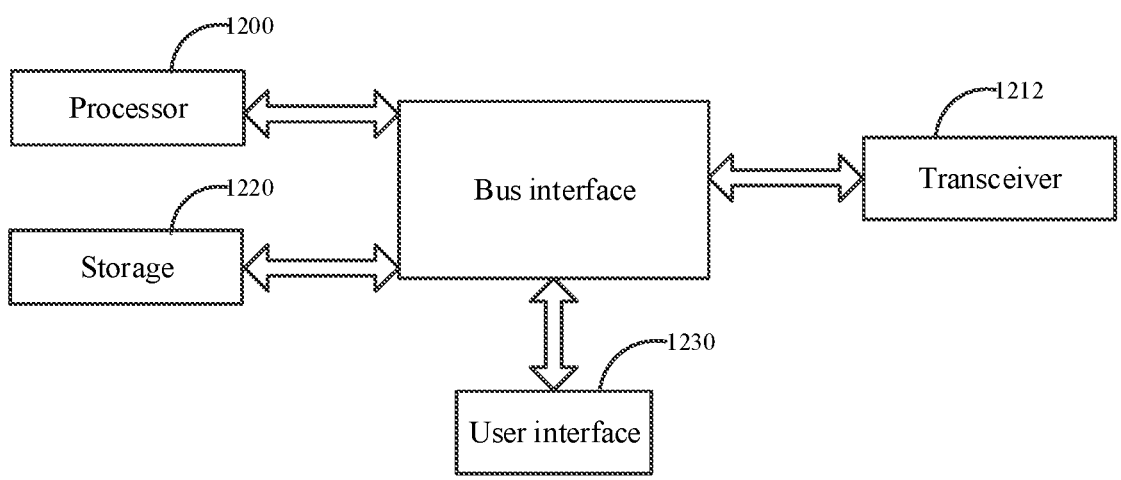
FIG. 12 is a schematic diagram of a terminal according to some embodiments of the present disclosure.

As shown in FIG. 12, some embodiments of the present disclosure also provide a user equipment. The user equipment includes a processor 1200, a storage 1220, a user interface 1230, and a transceiver 1212. The processor is configured to read programs in the storage 1220 and perform steps as follow: instructing a base station to transmit a reference signal by using a transmission beam obtained based on beam reciprocity; receiving the reference signal transmitted by the base station, and calculating a reception quality of the reference signal; receiving beam training signals transmitted by the base station, and calculating reception qualities of the beam training signals; comparing a reception quality of the reference signal with a reference reception quality obtained based on the reception qualities of the plurality of beam training signals, and determining, based on a result of the comparison, whether the beam reciprocity of the base station is established or not.

The transceiver 1212 is configured to receive and transmit data under a control of the processor 1200.

In FIG. 12, a bus architecture may include any number of interconnected buses and bridges. Specifically, one or more processors such as the processor 1200 and a storage such as the storage 1220 are linked together by the bus architecture. The bus architecture may also link together various other circuits such as peripheral devices, voltage regulators, and power management circuits, etc., which are well known in the art and therefore will not be further described herein. A bus interface provides an interface. The transceiver 1212 may be a plurality of elements, including a transmitter and a receiver, configured to provide means for communicating with various other devices over a transmission medium. Directed to different user equipments, the user interface 1230 may also be an interface capable of connecting an internal device or an external device needing to be connected to, including, but not limited to, a keypad, a display, a speaker, a microphone, a joystick, or the like.

The processor 1200 is responsible for managing the bus architecture and general transactions, and the storage 1220 may store data used by the processor 1200 when the processor 1200 performs operations.

The processor 1200 is further configured to transmit a first signaling to the base station, wherein the first signaling is used to instruct the base station to determine a transmission beam based on a current optimal reception beam of the base station or based on a reception beam used currently and instruct the base station to transmit the reference signal by using the determined transmission beam; or, transmit a second signaling to the base station, wherein the second signaling includes identification information of a target transmission beam, the second signaling is used to indicate the base station to determine, based on the identification information by using an optimal reception beam corresponding to the target transmission beam, a transmission beam and is used to instruct the base station to transmit the reference signal by using the determined transmission beam.

The processor 1200 is further configured to: if the beam reciprocity of the terminal is established, receive the reference signal by using a reception beam corresponding to a current transmission beam or a reception beam corresponding to the target transmission beam indicated to the base station; or, receive the reference signal by using candidate reception beams at a present time point, and determine a candidate reception beam having an optimal signal quality, and receive, by using the candidate reception beam having the optimal signal quality, the reference signal subsequently transmitted; or, receive the reference signal by using an optimal beam-training-signal reception beam; wherein the optimal beam-training-signal reception beam is a reception beam having an optimal signal quality for receiving the beam training signal.

The processor 1200 is further configured to: if the beam reciprocity of the terminal is established, receive the beam training signals by using a reception beam corresponding to a current transmission beam or a reception beam corresponding to the target transmission beam indicated to the base station; or, receive the beam training signals by using a reception beam having the optimal signal quality for receiving the reference signal; or, receive the beam training signal by using candidate reception beams at a present time point, respectively, and determine a candidate reception beam having an optimal signal quality, and receive, by using the candidate reception beam having the optimal signal quality, beam training signals transmitted subsequently.

The processor 1200 is further configured to: determine a maximum reception quality among the reception qualities of the plurality of beam training signals, and take the maximum reception quality as the reference reception quality; if the reception quality of the reference signal is greater than the reference reception quality, or if difference between the reference reception quality and the reception quality of the reference signal is less than a predefined threshold, determine that the beam reciprocity of the base station is established; otherwise, if the reception quality of the reference signal is smaller than or equal to the reference reception quality, or if difference between the reference reception quality and the reception quality of the reference signal is larger than or equal to the predefined threshold, determine that beam reciprocity of the base station is not established.

The processor 1200 is further configured to: sort the reception qualities of the plurality of beam training signals in a descending order, and select reception qualities of top K beam training signals in a sorting result, wherein K is an integer greater than 1; calculate an average value of the reception qualities of the K beam training signals, and take the average value as the reference reception quality; if the reception quality of the reference signal is greater than the reference reception quality, or if the difference between the reference reception quality and the reception quality of the reference signal is less than the predefined threshold, determine the beam reciprocity of the base station is established; otherwise, if the reception quality of the reference signal is smaller than or equal to the reference reception quality, or if the difference between the reference reception quality and the reception quality of the reference signal is larger than or equal to the predefined threshold, determine that beam reciprocity of the base station is not established.

The processor 1200 is further configured to: instruct the base station to transmit the plurality of beam training signals; receiving the plurality of beam training signals transmitted by the device specifically includes receiving the plurality of beam training signals transmitted according to the instruction by the base station.

The processor 1200 is further configured to: if the beam reciprocity of the base station is determined to be established, transmit first indication information to the base station, wherein the first indication information is used to instruct that the base station is to transmit data by using a reciprocal beam; or if the beam reciprocity of the base station is determined to not be established, transmit second indication information to the base station, wherein the second indication information is used to indicate that the base station is to transmit data by using a first designated transmission beam; or if the base station is determined to transmit data by using a beam indicated by the terminal and the beam reciprocity of the base station is determined to be established, transmit third indication information to the base station, wherein the third indication information is used to indicate that the base station is to transmit data by using a reciprocal beam; or if the base station is determined to transmit data by using the beam indicated by the terminal and the beam reciprocity of the base station is determined to not be established, transmit fourth indication information to the base station, wherein the fourth indication information is used to indicate that the base station is to transmit data by using a second designated transmission beam.

The second indication information includes an identifier of the first designated transmission beam. The fourth indication information includes an identifier of the second designated transmission beam.

The processor 1200 is further configured to: transmit to the base station the reception quality of the reference signal and the reference reception quality obtained based on the reception qualities of the plurality of beam training signals, so that the base station compares the reception quality of the reference signal with the reference reception quality obtained based on the reception qualities of the plurality of beam training signals, and determine, based on a result of the comparison, whether beam reciprocity of the base station is established or not; or compare the reception quality of the reference signal with the reference reception quality obtained based on the reception qualities of the plurality of beam training signals, and transmit a result of the comparison to the base station, so that the base station determines, based on the result of the comparison, whether the beam reciprocity of the base station is established or not.

Figure 13:
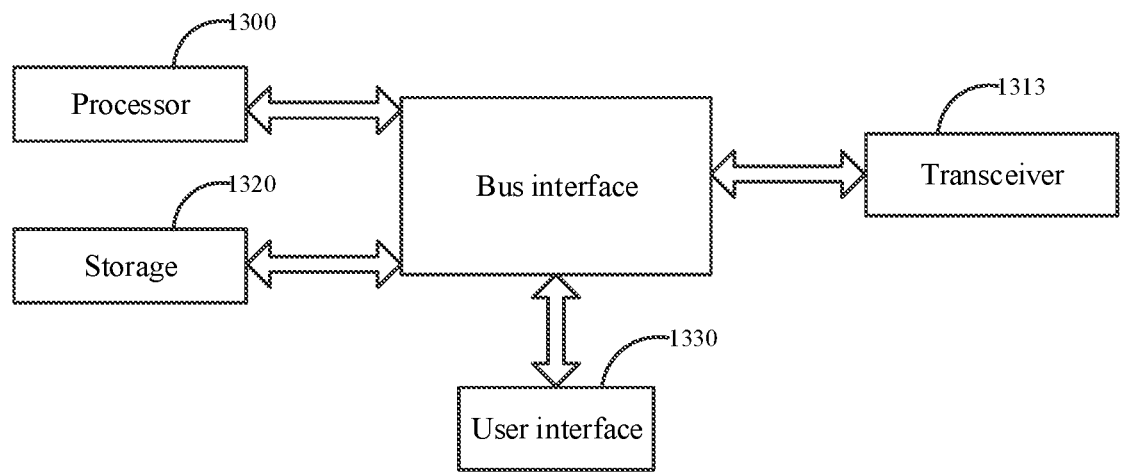
FIG. 13 is another schematic diagram of a terminal according to some embodiments of the present disclosure.

As shown in FIG. 13, some embodiments of the present disclosure also provide a user equipment. The user equipment includes a processor 1300, a storage 1320, a transceiver 1310, and a user interface 1330. The processor 1300 is configured to read programs in the storage 1320 and perform steps as follow: receiving an indication from a base station; transmitting, according to the indication from the base station, a reference signal by using a transmission beam obtained based on beam reciprocity, so that the base station calculates a reception quality of the reference signal; transmitting a plurality of beam training signals to the base station so that reception qualities of the plurality of beam training signals are calculated, respectively, a reception quality of the reference signal is compared with a reference reception quality obtained based on the reception qualities of the plurality of beam training signals, and whether beam reciprocity of the terminal is established or not is determined based on a result of the comparison.

The transceiver 1310 is configured to receive and transmit data under a control of the processor 1300.

In FIG. 13, a bus architecture may include any number of interconnected buses and bridges. Specifically, one or more processors such as the processor 1300 and a storage such as the storage 1320 are linked together by the bus architecture. The bus architecture may also link together various other circuits such as peripheral devices, voltage regulators, and power management circuits, etc., which are well known in the art and therefore will not be further described herein. A bus interface provides an interface. The transceiver 1310 may be a plurality of elements, including a transmitter and a receiver, configured to provide means for communicating with various other devices over a transmission medium. Directed to different user equipments, the user interface 1330 may also be an interface capable of connecting an internal device or an external device needing to be connected to, including, but not limited to, a keypad, a display, a speaker, a microphone, a joystick, or the like.

The processor 1300 is responsible for managing the bus architecture and general transactions, and the storage 1320 may store data used by the processor 1300 when the processor 1300 performs operations.

The processor 1300 is further configured to: receive a first signaling from the base station, determine, according to the first signaling, a transmission beam by using a current optimal reception beam or a reception beam used currently, and transmit the reference signal by using the determined transmission beam; or receive a second signaling from the base station, wherein the second signaling includes identification information of a target transmission beam; determine, based on the identification information, a transmission beam by using an optimal reception beam for receiving the target transmission beam, and transmit the reference signal by using the determined transmission beam.

The processor 1300 is further configured to: receive a first signaling from the base station, determine, according to the first signaling, a transmission beam by using a current optimal reception beam or a reception beam used currently, and transmit the reference signal by using the determined transmission beam; or receive a second signaling from the base station, wherein the second signaling includes identification information of a target transmission beam; determine, based on the identification information, a transmission beam by using an optimal reception beam for receiving the target transmission beam, and transmit the reference signal by using the determined transmission beam.

The processor 1300 is further configured to: receive from the base station an indication for transmitting a plurality of beam training signals; transmit the plurality of beam training signals to the base station according to the indication for transmitting the plurality of beam training signals.

The processor 1300 is further configured to: receive first indication information from the base station and transmit, according to the first indication information, data by using a reciprocal beam, wherein the first indication is transmitted by the base station when the base station determines that the beam reciprocity of the terminal is established; or receive second indication information from the base station, and transmit, according to the second indication information, data by using a first designated transmission beam, wherein the second indication information is transmitted by the base station when the base station determines that beam reciprocity of the terminal is not established; or receive third indication information from the base station, and transmit, according to the third indication information, data by using a reciprocal beam, wherein the third indication information is transmitted by the base station when the base station determines that beam reciprocity of the terminal is established and the terminal transmits data by using a beam indicated by the terminal; or receive fourth indication information from the base station and transmit, according to the fourth indication information, data by using a second designated transmission beam, wherein the fourth indication information is transmitted by the base station when the base station determines that the beam reciprocity of the terminal is not established and the terminal transmits data by using a beam indicated by the base station.

The second indication information includes an identifier of the first designated transmission beam. The processor 1300 is further configured to transmit, according to the fourth indication information, data by using a second designated transmission beam corresponding to the identifier of the second designated transmission beam.

The processor 1300 is further configured to: transmit a plurality of beam training signals to the base station so that the base station calculates the reception qualities of the plurality of beam training signals, respectively, compares a reception quality of the reference signal with a reference reception quality obtained based on the reception qualities of the plurality of beam training signals, and determine, based on a result of the comparison, whether beam reciprocity of the base station is established or not; or transmit a plurality of beam training signals to the base station so that the base station calculates the reception qualities of the plurality of beam training signals, respectively, transmits, to the terminal, a reception quality of the reference signal and a reference reception quality obtained based on the reception qualities of the plurality of beam training signals, the terminal compares the reception quality of the reference signal with the reference reception quality obtained based on the reception qualities of the plurality of beam training signals and determines, based on a result of the comparison, whether beam reciprocity of the terminal is established or not; or transmit the plurality of beam training signals to the base station so that the base station calculates the reception qualities of the plurality of beam training signals, respectively, compares a reception quality of the reference signal with a reference reception quality obtained based on the reception qualities of the plurality of beam training signals, and transmits a result of the comparison to the terminal, the terminal determines, based on a result of the comparison, whether beam reciprocity of the base station is established or not.

In several embodiments provided herein, it should be understood that the disclosed methods and apparatus may be implemented in other ways. For example, the product embodiments described above are merely illustrative, for example, a division of units is only one logical functional division, which may be implemented in another way in a practical application. For example, multiple elements or components may be combined or may be integrated into another system, or some features may be ignored or not performed. Optionally, coupling or direct coupling or communication connection between components shown or discussed herein may be indirect coupling or communication connection through some interfaces, devices or units and may be electrical connections, mechanical connections or other forms of connections.

In addition, various functional units in the embodiments of the present disclosure may be integrated in one processing unit, may be separately physically, or two or more of the various functional units may be integrated. The unit integrated as described above may be implemented either in a form of hardware or in a form of hardware plus software.

The above integrated unit implemented in a form of software functional units may be stored in a computer readable storage medium. The above software function units are stored in a storage medium and includes instructions for causing a computer device (which may be a personal computer, a server, or a network device, etc.) to perform a part of the steps of the method of various embodiments of the present disclosure. The storage medium includes a USB disk, a mobile hard disk, a Read-Only Memory (ROM), a Random Access Memory (RAM), a variety of media that may store program codes, such as a magnetic disk or an optical disk.

The foregoing are optional embodiments of the present disclosure and it should be noted that several modifications and embellishments may be made to those of ordinary skills in the art without departing from the principle of the present disclosure, and these improvements and embellishments should also be considered to be within the scope of the present disclosure.

What is claimed is:

1. A method of determining beam reciprocity of a device, applied to a first device and comprising:
    instructing a second device to transmit, by using a transmission beam obtained based on beam reciprocity, a reference signal;
    receiving the reference signal transmitted by the second device, and calculating a reception quality of the reference signal;
    receiving a plurality of beam training signals transmitted by the second device, and calculating reception qualities of the plurality of beam training signals, respectively;
    comparing the reception quality of the reference signal with a reference reception quality obtained based on the reception qualities of the plurality of beam training signals, and determining, based on a result of the comparison, whether the beam reciprocity of the second device is established or not,
    wherein the instructing the second device to transmit a reference signal using a transmission beam based on beam reciprocity, comprises
        transmitting a second signaling to the second device, wherein the second signaling comprises identification information of a target transmission beam, the second signaling is used to indicate the second device to determine, based on the identification information by using an optimal reception beam corresponding to the target transmission beam, a transmission beam, and is used to instruct the second device to transmit, by using the determined transmission beam, the reference signal.

2. The method according to claim 1, wherein receiving the reference signal transmitted by the second device, comprises:
    receiving the reference signal by using a reception beam corresponding to a current transmission beam or a reception beam corresponding to a target transmission beam indicated to the second device, if the first device has the beam reciprocity; or
    at a present time point, receiving the reference signals by using a plurality of candidate reception beams, and determining a candidate reception beam having an optimal signal quality, and receiving, by using the candidate reception beam having the optimal signal quality, the reference signal subsequently transmitted; or receiving the reference signal by using an optimal beam-training-signal reception beam, wherein the optimal beam-training-signal reception beam is a reception beam having an optimal signal quality for receiving the plurality of beam training signals.

3. The method according to claim 1, wherein receiving the plurality of beam training signals transmitted by the second device, comprises:

receiving the plurality of beam training signals by using a reception beam corresponding to a current transmission beam or a reception beam corresponding to a target transmission beam indicated to the second device, if the first device has the beam reciprocity; or receiving the plurality of beam training signals by using a reception beam having an optimal signal quality for receiving the reference signal; or receiving the plurality of beam training signals by using candidate reception beams at a present time point, respectively, and determining a candidate reception beam having an optimal signal quality, and receiving, by using the candidate reception beam having the optimal signal quality, beam training signals transmitted subsequently.

4. The method according to claim 1, wherein comparing the reception quality of the reference signal with the reference reception quality obtained based on the reception qualities of the plurality of beam training signals, and determining, based on the result of the comparison, whether the beam reciprocity of the second device is established or not, comprises:

determining a maximum reception quality among the reception qualities of the plurality of beam training signals, and taking the maximum reception quality as the reference reception quality;

determining that the beam reciprocity of the second device is established if the reception quality of the reference signal is greater than the reference reception quality, or if difference between the reference reception quality and the reception quality of the reference signal is less than a predefined threshold; otherwise, determining that the beam reciprocity of the second device is not established.

5. The method according to claim 1, wherein comparing the reception quality of the reference signal with the reference reception quality obtained based on the reception qualities of the plurality of beam training signals, and determining, based on the result of the comparison, whether the beam reciprocity of the second device is established or not, comprises:

sorting the reception qualities of the plurality of beam training signals in a descending order, and selecting reception qualities of top K beam training signals in a sorting result, wherein K is an integer greater than 1;

calculating an average value of the reception qualities of the K beam training signals, and taking the average value as the reference reception quality;

determining that the beam reciprocity of the second device is established if the reception quality of the reference signal is greater than the reference reception quality, or if the difference between the reference reception quality and the reception quality of the reference signal is less than a predefined threshold; otherwise, determining that the beam reciprocity of the second device is not established.

6. The method according to claim 1, wherein before receiving the plurality of beam training signals transmitted by the second device, the method further comprises:

instructing the second device to transmit the plurality of beam training signals; and, receiving the plurality of beam training signals transmitted by the second device specifically comprises receiving the plurality of beam training signals transmitted according to the indication by the second device.

7. The method according to claim 6, further comprising:

transmitting first indication information to the second device, if the beam reciprocity of the second device is determined to be established, wherein the first indication information is used to instruct the second device to transmit, by using a reciprocal beam, data; or transmitting second indication information to the second device, if the beam reciprocity of the second device is determined to not be established, wherein the second indication information is used to instruct the second device to transmit, by using a first designated transmission beam, data; or transmitting third indication information to the second device, if the second device is determined to transmit, by using a beam indicated by the first device, data and the beam reciprocity of the second device is determined to be established, wherein the third indication information is used to indicate the second device to transmit, by using a reciprocal beam, data; or transmitting fourth indication information to the second device, if the second device is determined to transmit, by using a beam indicated by the first device, data and the beam reciprocity of the second device is determined to not be established, wherein the fourth indication information is used to indicate the second device to transmit, by using a second designated transmission beam, data.

8. The method according to claim 7, wherein the second indication information comprises an identifier of the first designated transmission beam, the fourth indication information comprises an identifier of the second designated transmission beam.

9. The method according to claim 1, wherein comparing the reception quality of the reference signal with the reference reception quality obtained based on the reception qualities of the plurality of beam training signals, and determining, based on the result of the comparison, whether the beam reciprocity of the second device is established or not, comprises:

comparing, by the first device, the reception quality of the reference signal with the reference reception quality obtained based on the reception qualities of the plurality of beam training signals, and determining, based on the result of the comparison, whether the beam reciprocity of the second device is established or not; or transmitting, by the first device to the second device, the reception quality of the reference signal and the reference reception quality obtained based on the reception qualities of the plurality of beam training signals, so that the second device compares the reception quality of the reference signal with the reference reception quality obtained based on the reception qualities of the plurality of beam training signals, and determines, based on the result of the comparison, whether the beam reciprocity of the second device is established or not; or comparing, by the first device, the reception quality of the reference signal with the reference reception quality obtained based on the reception qualities of the plurality of beam training signals, and transmitting the result of the comparison to the second device, so that the second device determines, based on the result of the comparison, whether the beam reciprocity of the second device is established or not.

10. A method of determining beam reciprocity of a device, applied to a second device and comprising:
receiving an indication from a first device;
transmitting, according to the indication from the first device, a reference signal by using a transmission beam obtained based on beam reciprocity, so that the first device calculates a reception quality of the reference signal;
transmitting a plurality of beam training signals to the first device, so that reception qualities of the plurality of beam training signals are calculated, respectively, the reception quality of the reference signal is compared with a reference reception quality obtained based on the reception qualities of the plurality of beam training signals, and whether beam reciprocity of the second device is established or not is determined based on a result of the comparison,
wherein transmitting, according to the indication from the first device, the reference signal by using the transmission beam obtained based on beam reciprocity, comprises:
receiving a second signaling from the first device, the second signaling comprising identification information of a target transmission beam; determining, based on the identification information, a transmission beam by using an optimal reception beam for receiving the target transmission beam; and transmitting the reference signal by using the determined transmission beam.

11. The method according to claim 10, wherein before transmitting the plurality of beam training signals to the first device, the method further comprises:
receiving from the first device an indication for transmitting the plurality of beam training signals;
transmitting the plurality of beam training signals to the first device specifically comprises:
transmitting the plurality of beam training signals to the first device according to the indication for transmitting the plurality of beam training signals.

12. The method according to claim 10, further comprising:
receiving first indication information from the first device and transmitting, according to the first indication information, data by using a reciprocal beam, wherein the first indication information is transmitted by the first device when the first device determines that the beam reciprocity of the second device is established; or
receiving second indication information from the first device, and transmitting, according to the second indication information, data by using a first designated transmission beam, wherein the second indication information is transmitted by the first device when the first device determines that beam reciprocity of the second device is not established; or
receiving third indication information from the first device, and transmitting, according to the third indication information, data by using a reciprocal beam, wherein the third indication information is transmitted by the first device when the first device determines that beam reciprocity of the second device is established and the second device transmits data by using a beam indicated by the first device; or
receiving fourth indication information from the first device and transmitting, according to the fourth indication information, data by using a second designated transmission beam, wherein the fourth indication information is transmitted by the first device when the first device determines that the beam reciprocity of the second device is not established and the second device transmits data by using a beam indicated by the first device.

13. The method according to claim 12, wherein the second indication information comprises an identifier of the first designated transmission beam;
the fourth indication information further comprises an identifier of the second designated transmission beam;
transmitting, according to the fourth indication information, data by using the second designated transmission beam, specifically comprises: transmitting, according to the fourth indication information, data by using the second designated transmission beam corresponding to the identifier of the second designated transmission beam.

14. The method according to claim 10, wherein transmitting the plurality of beam training signals to the first device, so that reception qualities of the plurality of beam training signals are calculated, respectively, the reception quality of the reference signal is compared with a reference reception quality obtained based on the reception qualities of the plurality of beam training signals, and whether beam reciprocity of the second device is established or not is determined based on the result of the comparison, comprises:
transmitting, by the second device, the plurality of beam training signals to the first device such that the first device calculates reception qualities of the plurality of beam training signals, respectively, compares the reception quality of the reference signal with the reference reception quality obtained based on the reception qualities of the plurality of beam training signals, and determines, based on the result of the comparison, whether the beam reciprocity of the second device is established or not; or,
transmitting, by the second device, the plurality of beam training signals to the first device such that the first device calculates the reception qualities of the plurality of beam training signals, respectively, transmits to the second device the reception quality of the reference signal and the reference reception quality obtained based on the reception qualities of the plurality of beam training signals, and the second device compares the reception quality of the reference signal with the reference reception quality obtained based on the reception qualities of the plurality of beam training signals and determines, based on the result of the comparison, whether the beam reciprocity of the second device is established or not; or
transmitting, by the second device, the plurality of beam training signals to the first device so that the first device calculates reception qualities of the plurality of beam training signals, respectively, compares the reception quality of the reference signal with the reference reception quality obtained based on the reception qualities of the plurality of beam training signals, and transmits a result of the comparison to the second device, the second device determines, based on the result of the comparison, whether the beam reciprocity of the second device is established or not.

15. An apparatus of determining beam reciprocity of a device, comprising:
- an indication circuit, configured to instruct a second device to transmit a reference signal by using a transmission beam obtained based on beam reciprocity;
- a first calculation circuit, configured to receive the reference signal transmitted by the second device, and calculate a reception quality of the reference signal;
- a second calculation circuit, configured to receive a plurality of beam training signals transmitted by the second device, and calculate reception qualities of the plurality of beam training signals, respectively;
- a processing circuit, configured to compare the reception quality of the reference signal with a reference reception quality obtained based on the reception qualities of the plurality of beam training signals, and determine, based on a result of the comparison, whether the beam reciprocity of the second device is established or not,
- wherein the indication circuit is specifically configured to:
  - transmit a second signaling to the second device, wherein the second signaling comprises identification information of a target transmission beam, the second signaling is used to indicate the second device to determine, based on the identification information by using an optimal reception beam corresponding to the target transmission beam, a transmission beam and is used to instruct the second device to transmit, by using the determined transmission beam, the reference signal.

16. An electronic device, comprising:
a housing, a processor, a storage, a circuit board, and a power supply circuit, wherein the circuit board is disposed inside space enclosed by the housing, and the processor and the storage are disposed on the circuit board, the power supply circuit is used for supplying power to the processor, the storage, the circuit board in the electronic device, the storage is used for storing executable program codes, the processor executes a program corresponding to the executable program codes by reading the executable program codes stored in the storage and executes the method of determining beam reciprocity of a device according to claim 1.

17. An electronic device, comprising:
a housing, a processor, a storage, a circuit board, and a power supply circuit, wherein the circuit board is disposed inside space enclosed by the housing, and the processor and the storage are disposed on the circuit board, the power supply circuit is used for supplying power to the processor, the storage, the circuit board in the electronic device, the storage is used for storing executable program codes, the processor executes a program corresponding to the executable program codes by reading the executable program codes stored in the storage and executes the method of determining beam reciprocity of a device according to claim 10.

* * * * *